United States Patent
Xin et al.

(10) Patent No.: US 11,586,624 B2
(45) Date of Patent: Feb. 21, 2023

(54) INTEGRATED NATIVE VECTORIZED ENGINE FOR COMPUTATION

(71) Applicant: Databricks Inc., San Francisco, CA (US)

(72) Inventors: Shi Xin, San Francisco, CA (US); Alexander Behm, Lafayette, CA (US); Shoumik Palkar, Sunnyvale, CA (US); Herman Rudolf Petrus Catharina van Hövell tot Westerflier, The Hague (NL)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 17/237,979

(22) Filed: Apr. 22, 2021

(65) Prior Publication Data

US 2022/0100761 A1 Mar. 31, 2022

Related U.S. Application Data

(60) Provisional application No. 63/084,458, filed on Sep. 28, 2020.

(51) Int. Cl.
*G06F 16/2453* (2019.01)
*G06F 16/2458* (2019.01)
*G06F 16/25* (2019.01)

(52) U.S. Cl.
CPC .... *G06F 16/24542* (2019.01); *G06F 16/2471* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 6,505,269 B1 | 1/2003 | Potter | |
| 7,519,577 B2 | 4/2009 | Brundage | |
| 2018/0089267 A1* | 3/2018 | Hatem | G06F 16/2455 |
| 2018/0150521 A1* | 5/2018 | Skalkowski | G06F 16/2455 |
| 2018/0173753 A1* | 6/2018 | Pei | G06F 16/2246 |
| 2018/0268000 A1* | 9/2018 | McManus | G06F 16/2471 |
| 2019/0102431 A1* | 4/2019 | Bishnoi | G06N 7/08 |
| 2020/0050612 A1* | 2/2020 | Bhattacharjee | G06F 16/2471 |
| 2020/0065303 A1 | 2/2020 | Bhattacharjee | |
| 2020/0233869 A1* | 7/2020 | Gawande | H04L 67/1029 |

* cited by examiner

*Primary Examiner* — Christopher J Raab
(74) *Attorney, Agent, or Firm* — Fenwick & West LLP

(57) ABSTRACT

A system comprises an interface, a processor, and a memory. The interface is configured to receive a query. The processor is configured to: determine a set of nodes for the query; determine whether a node of the set of nodes comprises a first engine node type or a second engine node type, wherein determining whether the node of the set of nodes comprises the first engine node type or the second engine node type is based at least in part on determining whether the node is able to be executed in a second engine; and generate a plan based at least in part on the set of nodes. The memory is coupled to the processor and is configured to provide the processor with instructions.

19 Claims, 19 Drawing Sheets

INTEGRATED NATIVE VECTORIZED ENGINE FOR COMPUTATION

CROSS REFERENCE TO OTHER APPLICATIONS

This application claims priority to U.S. Provisional Patent Application No. 63/084,458 entitled INTEGRATED NATIVE VECTORIZED ENGINE FOR COMPUTATION filed Sep. 28, 2020 which is incorporated herein by reference for all purposes.

BACKGROUND OF THE INVENTION

A system for executing a query comprises an engine for analyzing a query to determine a set of nodes comprising an execution plan and executing the set of nodes using an execution engine. In order to improve query execution performance, a second query execution engine is created, wherein queries execute faster using the second query execution engine than the first query execution engine. However, implementing the second query execution engine requires implementing execution of each query node on the second query execution engine individually. This creates a problem wherein a very large engineering effort is required to implement enough nodes on the second query execution engine in order to be able to support the typical queries requested by system users.

BRIEF DESCRIPTION OF THE DRAWINGS

Various embodiments of the invention are disclosed in the following detailed description and the accompanying drawings.

DETAILED DESCRIPTION

Figure 1:
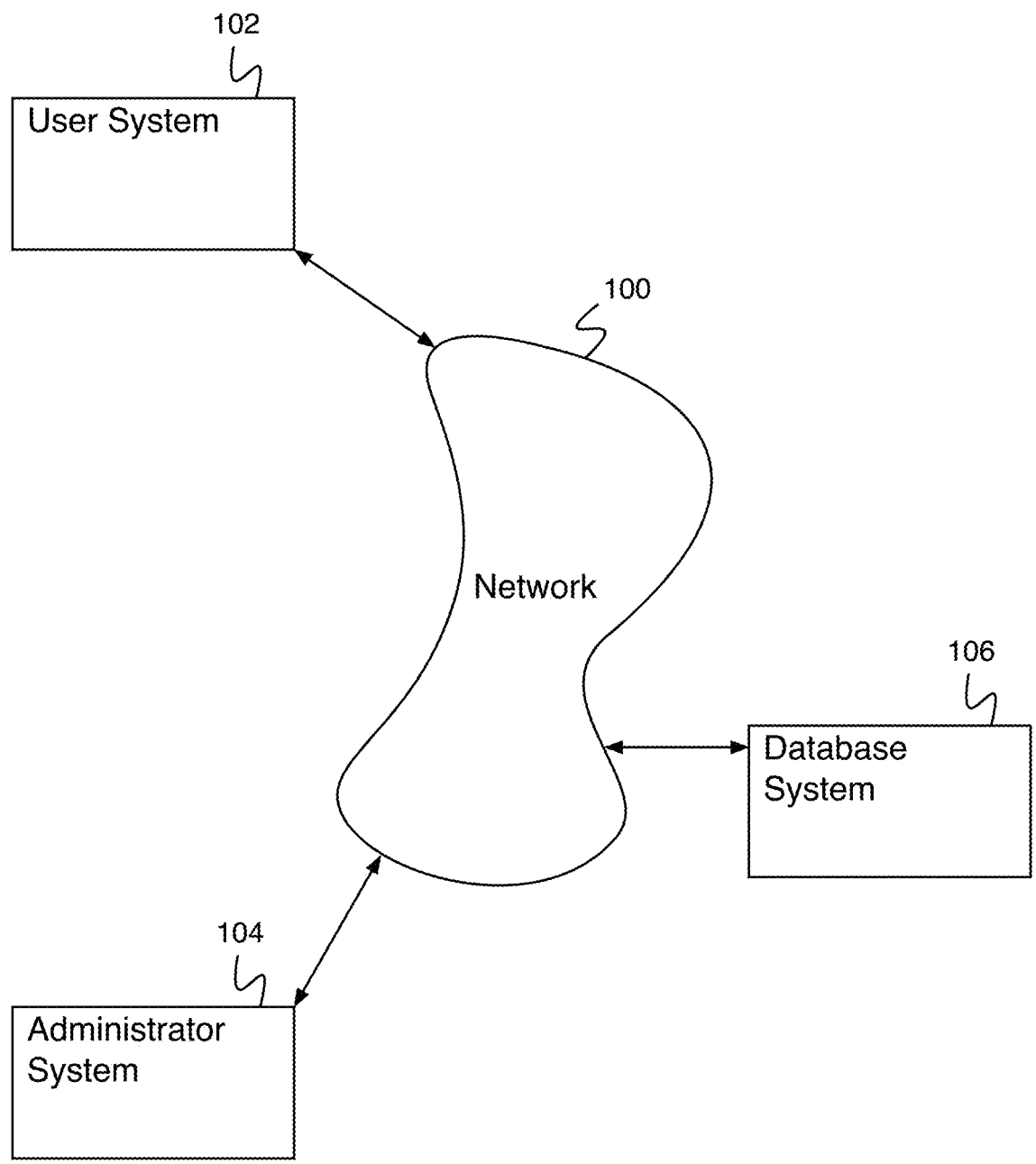
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system comprises an interface configured to receive a query, a processor configured to determine a set of nodes for the query, determine whether a node of the set of nodes comprises a first engine node type or a second engine node type, wherein determining whether the node of the set of nodes comprises the first engine node type or the second engine node type is based at least in part on determining whether the node is able to be executed in a second engine, and generate a plan based at least in part on the set of nodes, and a memory coupled to the processor and configured to provide the processor with instructions.

A system for an integrated native vectorized engine for computation comprises a system for computing a query result. For example, the system for computing a query result computes the result of an SQL query. The system for computing a query result comprises a first query engine (e.g., a Java-based query engine) and a second engine (e.g., a native C++ query engine). When query processing begins, the query is analyzed to determine a set of nodes comprising an execution plan. Nodes form a directed acyclic graph of operations for computing the query result. In some embodiments, the directed acyclic graph of operations comprises a linear set of operations. For each node, it may be advantageous to execute the node using the first engine or it may be advantageous to execute the node using the second engine. In addition, processing for the node may not be implemented using the first engine or the second engine. Typically, processing using the second engine is advantageous compared to processing using the first engine but not all nodes are implemented for processing using the second engine. It is not always advantageous to process all possible nodes on the more advantageous engine, as translating data from a first engine data format to a second engine data format or from a second engine data format to a first engine data format will incur additional overhead. For example, the first engine processes data a single row at a time, and the second engine processes data in groups of rows, grouped by column, or another data format. For each node in the set of nodes it is determined whether the node comprises a first engine node type or a second engine node type, based at least in part on determining whether the node is able to be executed in a second engine.

In some embodiments, the optimal determination comprises determining that a group of nodes executable by the second engine at the beginning of the set of nodes comprise second engine nodes. Going from the beginning of the set of nodes to the end of the set of nodes, once a node of the set of nodes that is not executable by the second engine is identified, that node and all nodes after it are determined to be first engine nodes. A plan is generated based at least in part on the set of nodes—for example, indicating an execution plan for the first engine. In some embodiments, the plan additionally comprises an execution plan for the second engine. In some embodiments, the execution plan for the first engine and/or the second engine includes indicating system resources and/or cluster resources for executing nodes of the first engine and/or second engine. For example, a first portion of a cluster comprises a first engine cluster portion for executing first engine nodes and a second portion of a cluster comprises a second engine cluster portion for executing second engine nodes.

In some embodiments, the plan indicates cluster resources to execute a node of the set of nodes. In some embodiments, the plan indicates transfer of data between cluster resources prior to execution of a node of the set of nodes. For example, after a first cluster node and before a second cluster node, data is transferred from a first engine cluster portion to a second engine cluster portion. After a second cluster node and before a first cluster node, data is transferred from a second engine cluster portion to a first engine cluster portion. In some embodiments, data transfer is executed using first engine data transfer processes on both the first engine cluster portion and the second engine cluster portion. In some embodiments, the data is translated after being transferred between cluster resources (e.g., from a first engine data format to a second engine data format or vice versa). In various embodiments, translating data comprises batching rows, aggregating rows, de-aggregating rows, transposing a data matrix, or transforming data in any other appropriate way.

The system additionally comprises other processes for integrating a newly introduced second computation engine in a system for a first computation engine. For example, a system for a first computation engine comprises a metrics reporting system for reporting metrics data from computation of each node by the first computation engine. Integrating the second computation engine while utilizing the metrics reporting system comprises providing communications between the metrics reporting system and the second computation engine. In some embodiments, a dummy first engine node is created corresponding to a second engine node, wherein computation of the second engine node is performed by the second engine and metrics data is provided from the second engine to the dummy first engine node for metrics reporting using the metrics reporting engine. For example, the system comprises a memory manager for managing memory while computing a query result. The memory manager is configured such that the first engine or the second engine requests a memory allocation from a system memory manager or releases the memory allocation to the system memory manager. The system memory manager is responsible for memory used by both computing engines. For example, handling memory for both computing engines using a single memory manager allows consistent handling of memory pressure between the two engines. Handling of memory pressure comprises providing a request for memory spilling to one or both computing engines.

In some embodiments, memory management comprises an interface between the first engine and the second engine. When running on the same computer, the two engines need to allocate memory for operations from the same memory manager. The memory manager allocates memory from a single resource pool (e.g., random access memory (RAM) on the computer). In order to avoid running out of memory, the two engines need to coordinate how to allocate and free memory. For example, both the first engine and the second engine can reserve memory using the memory manager. The memory manager can ask the first engine or the second engine to free memory in the event available memory is out (e.g., or is running out).

The system for an integrated native vectorized engine for computation improves the computer by integrating a second computation engine into a system designed for computation using a first computation engine. The system is able to take advantage of the new faster second computation engine where possible while utilizing the first computation engine where necessary. This allows performance benefits of the second engine to be achieved without requiring replacement of every part of the first computation engine. In addition, in some embodiments, the system improves the computer by enabling improved reporting using the reporting services of a first engine while using the faster computing of a second engine. The system thereby improves processor efficiency and reporting efficiency to a user.

In some embodiments, a system comprises an interface configured to receive a query, a processor configured to determine a set of nodes for the query, determine whether a node of the set of nodes comprises a first engine node type, a second engine node type, a third engine node type, etc., wherein determining whether the node of the set of nodes comprises the first engine node type, the second engine node type, the third engine node type, etc. is based at least in part on determining whether the node is able to be executed in a second engine, in a third engine, etc., and generate a plan based at least in part on the set of nodes, and a memory coupled to the processor and configured to provide the processor with instructions.

In various embodiments, it is determined whether to execute commands using an engine from a pool of engines (e.g., a first engine, a second engine, a third engine, etc.) based at least in part on a processing speed for an engine, a transition cost between engines, and/or any other appropriate factor. In some embodiments, a generalized engine selection problem uses a cost-based framework to minimize the overall query runtime while considering the capabilities of the different engines and their transition penalties. In some embodiments, this generalized engine selection uses a heuristic search, dynamic programming, or other appropriate solution.

FIG. 1 is a block diagram illustrating an embodiment of a network system. In some embodiments, the network system of FIG. 1 comprises a system for an integrated native vectorized engine for computation. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and database system 106 communicate via network 100.

User system 102 comprises a user system for use by a user. For example, user system 102 comprises a system for communication, data access, computation, etc. A user uses user system 102 to access database system commands utilizing database system 106—for example, to add data, remove data, modify data, process data, execute database queries, etc. In some embodiments, database system 106 comprises a plurality of nodes. In some embodiments, the plurality of nodes comprise a cluster-based database system for storing database data (e.g., large amounts of database data, big data, etc.), processing database commands, determining computation values, executing queries, etc.

Administrator system 104 comprises an administrator system for use by an administrator. For example, administrator system 104 comprises a system for communication, data access, computation, etc. An administrator uses administrator system 104 to maintain database system 106. For example, an administrator uses administrator system 104 to start and/or stop services on database system 106, to reboot database system 106, to install software on database system 106, to add, modify, and/or remove data on database system 106, etc.

Database system 106 comprises a database system for storing data, executing queries on data, providing query results, etc. In various embodiments, database system 106 comprises a single computer, a plurality of computers, a cluster system, a plurality of virtual machines, etc. For example, database system 106 comprises an interface configured to receive a query, a processor configured to determine a set of nodes for the query, determine whether a node of the set of nodes comprises a first engine node type or a second engine node type, wherein determining whether the node of the set of nodes comprises the first engine node type or the second engine node type is based at least in part on determining whether the node is able to be executed in a second engine, and generate a plan based at least in part on the set of nodes, and a memory coupled to the processor and configured to provide the processor with instructions.

Figure 2:
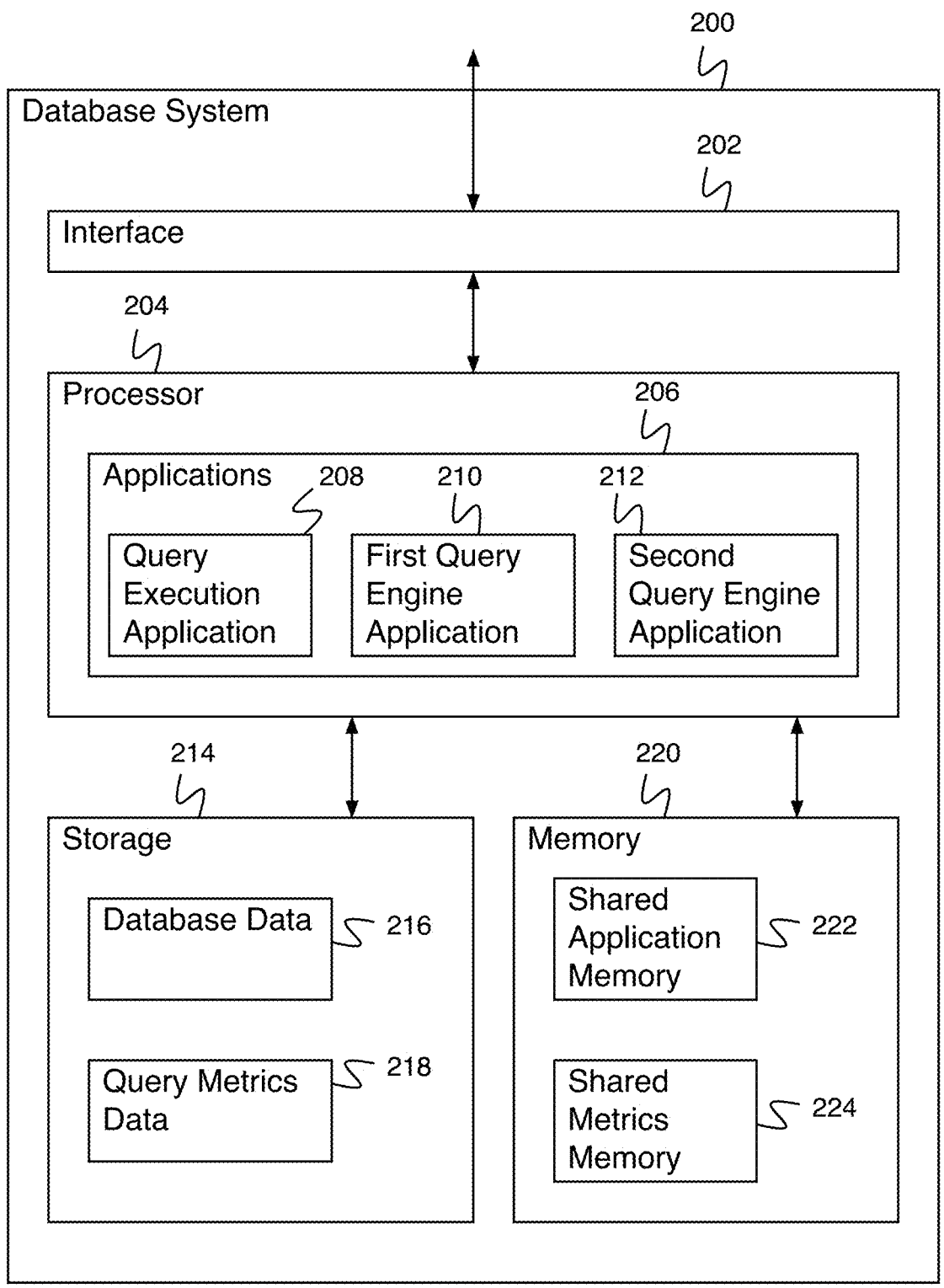
FIG. 2 is a block diagram illustrating an embodiment of a database system.

FIG. 2 is a block diagram illustrating an embodiment of a database system. In some embodiments, database system 200 comprises database system 106 of FIG. 1. In the example shown, database system 200 comprises interface 202. For example, interface 202 comprises an interface for receiving data, providing data, receiving a request to delete or modify data, receiving a database query, providing a database query response, etc. Processor 204 comprises a processor for executing applications 206. Applications 206 comprise query execution application 208, first query engine application 210, and second query engine application 212. Query execution application 208 comprises an application for executing a database query (e.g., a SQL query) on stored data (e.g., database data 216).

For example, query execution application 208 comprises an application configured to determine a set of nodes for a query, determine whether a node of the set of nodes comprises a first engine node type or a second engine node type, wherein determining whether the node of the set of nodes comprises the first engine node type or the second engine node type is based at least in part on determining whether the node is able to be executed in a second engine, and generate a plan based at least in part on the set of nodes. First query engine application 210 comprises a first engine for executing a query. In some embodiments, first query engine application 210 comprises a fully implemented previously existing query engine application. Second query engine application 212 comprises a second engine for executing a query. In some embodiments, second query engine application 212 comprises an application for an integrated native vectorized engine. Query execution application 208 utilizes first query engine application 210 and second query engine application 212 for executing nodes of a set of nodes for a query. In some embodiments, applications 206 additionally comprises a memory manager application (e.g., an application for allocating memory, tracking total memory allocations, determining when memory cannot be allocated, requesting memory release, etc.). For example, a memory manager application manages memory allocation for first query engine application 210 and second query engine application 212 from a single memory pool (e.g., shared application memory 224). In some embodiments, applications 206 comprise any other appropriate applications (e.g., an index maintenance application, a communications application, a chat application, a web browser application, a document preparation application, a report preparation application, a user interface application, a data analysis application, etc.). Storage 214 comprises a device (e.g., a hard drive, a semiconductor memory, etc.) used for storing database data 216 (e.g., a stored data set, a portion of a stored data set, data for executing a query) and query metrics data 218 (e.g., query execution metrics—for example, number of rows processed, total processing time, number of empty cells identified, etc.). For example, query metrics data 218 comprises metrics retrieved from shared metrics memory 224 (e.g., by first query engine application 210), processed if necessary, and stored. Memory 220 comprises shared application memory 222 comprising data associated with applications 206 and shared metrics memory 224. For example, shared metrics memory comprises a memory space accessible by both first query engine application 210 and second query engine application 212 for storing metrics data to be accessed by a metrics processing application (for example, first query engine application 210 comprises a metrics processing application) and processed. For example, after processing, processed metrics are stored in query metrics data 218 and/or are provided (e.g., to a job requesting user).

Figure 3A:
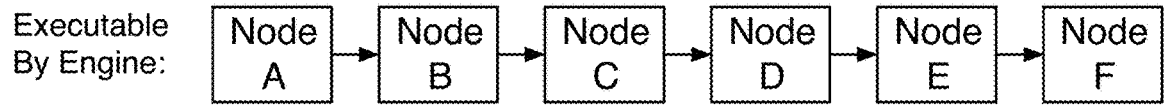
FIG. 3A is a block diagram illustrating an embodiment of a set of nodes.

FIG. 3A is a block diagram illustrating an embodiment of a set of nodes. In the example shown, the set of nodes comprising Node A, Node B, Node C, Node D, Node E, and Node F comprise a set of nodes for executing a query. For example, executing the set of nodes in order from Node A through Node F comprises executing a query. Nodes are executable using a first engine and using a second engine. In the example shown, all nodes are executable using the first engine, and a subset of the nodes are executable using the second engine (e.g., Node A, Node B, Node C, Node E, and Node F are executable using the second engine).

Figure 3B:
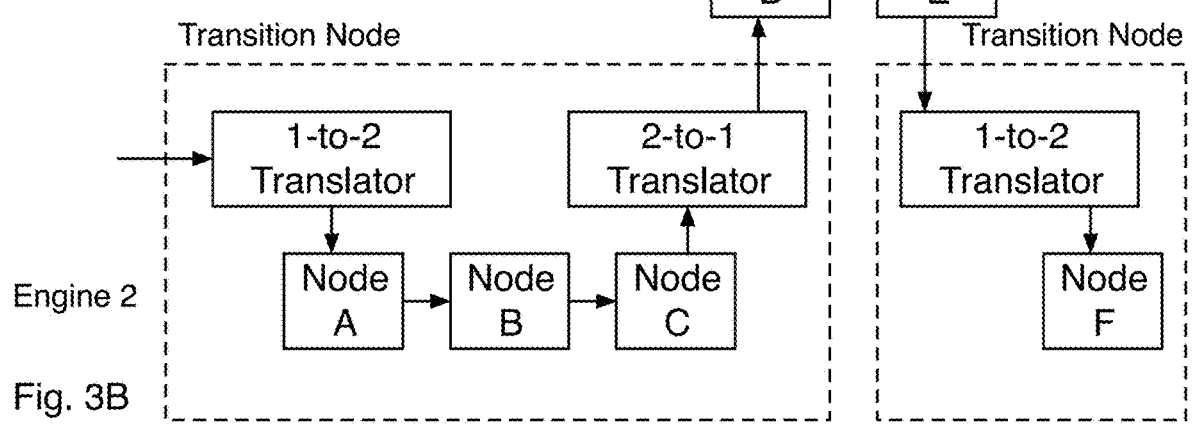
FIG. 3B is a block diagram illustrating an embodiment of a first execution plan for a set of nodes.

FIG. 3B is a block diagram illustrating an embodiment of a first execution plan for a set of nodes. In the example shown, nodes are executed by the second engine if they are executable by the second engine and nodes are executed by the first engine if they are not executable by the second engine. Data first passes through a 1-to-2 translator for converting data from an engine 1 format to an engine 2 format, then Node A, Node B, and Node C are executed by engine 2. In some embodiments, a 1-to-2 translator is not required at the beginning of the process. Data then passes through a 2-to-1 translator for converting the data from an engine 2 format to an engine 1 format. Node D and Node E are executed by engine 1. Data then passes through a 1-to-2 translator for converting the data from an engine 1 format to an engine 2 format. Node F is executed by engine 2. For example, the initial 1-to-2 translator, Node A, Node B, Node C, and the following 2-to-1 translator are encapsulated in a transition node for execution by engine 2. The final 1-to-2 translator and node F are additionally encapsulated in a transition node for execution by engine 2.

Figure 3C:
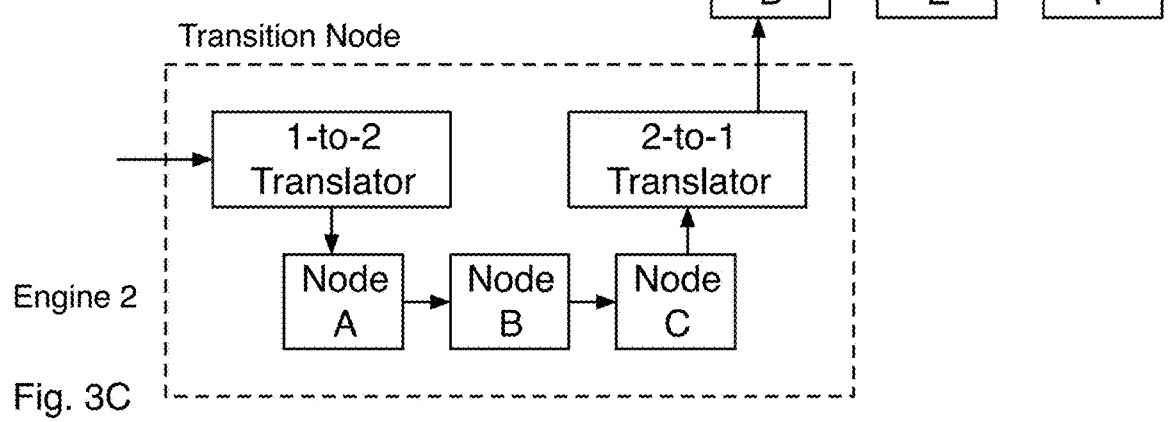
FIG. 3C is a block diagram illustrating an embodiment of a second execution plan for a set of nodes.

FIG. 3C is a block diagram illustrating an embodiment of a second execution plan for a set of nodes. In the example shown, nodes are executed by the second engine if they are executable by the second engine and part of a contiguous group of nodes executable by the second engine at the start of the set of nodes, and are executed by the first engine otherwise. Node A, Node B, and Node C are executed by engine 2. Data then passes through a 2-to-1 translator for converting the data from an engine 2 format to an engine 1 format. Node D, Node E, and Node F are then executed by engine 1. For example, the 1-to-2 translator, Node A, Node B, Node C, and the following 2-to-1 translator are encapsulated in a transition node for execution by engine 2.

In some embodiments, the system determines to execute as many nodes as it can using engine 2 but making only one data translation during execution.

Figure 3D:
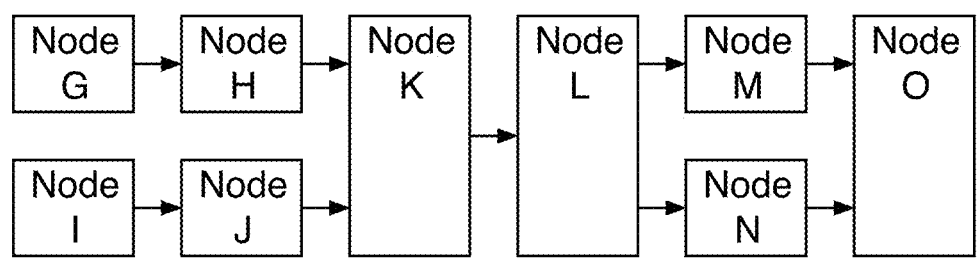
FIG. 3D is a block diagram illustrating an embodiment of a set of nodes.

FIG. 3D is a block diagram illustrating an embodiment of a set of nodes. In the example shown, the set of nodes comprises a non-trivial directed acyclic graph. For example, any set of nodes comprising a directed acyclic graph comprises a valid set of nodes for execution by the first engine and the second engine. In the example shown, Node G is executed, followed by Node H. In parallel, Node I is executed followed by Node J. Node K is executed using the output from both Node H and Node J. Node L processes the output of Node K, and Node M and Node N each process the output of Node L in parallel. Node O processes the output of both Node M and Node N. In various embodiments, in the event a node with multiple inputs (e.g., Node K, Node O) is executable by engine 2, it may be assigned to engine 2 only in the event that the nodes producing both inputs are executed by engine 2, it may be assigned to engine 2 in the event that one or more of its inputs is executed by engine 2, or it may be assigned to engine 2 without regard for the engine producing its inputs.

Figure 4:
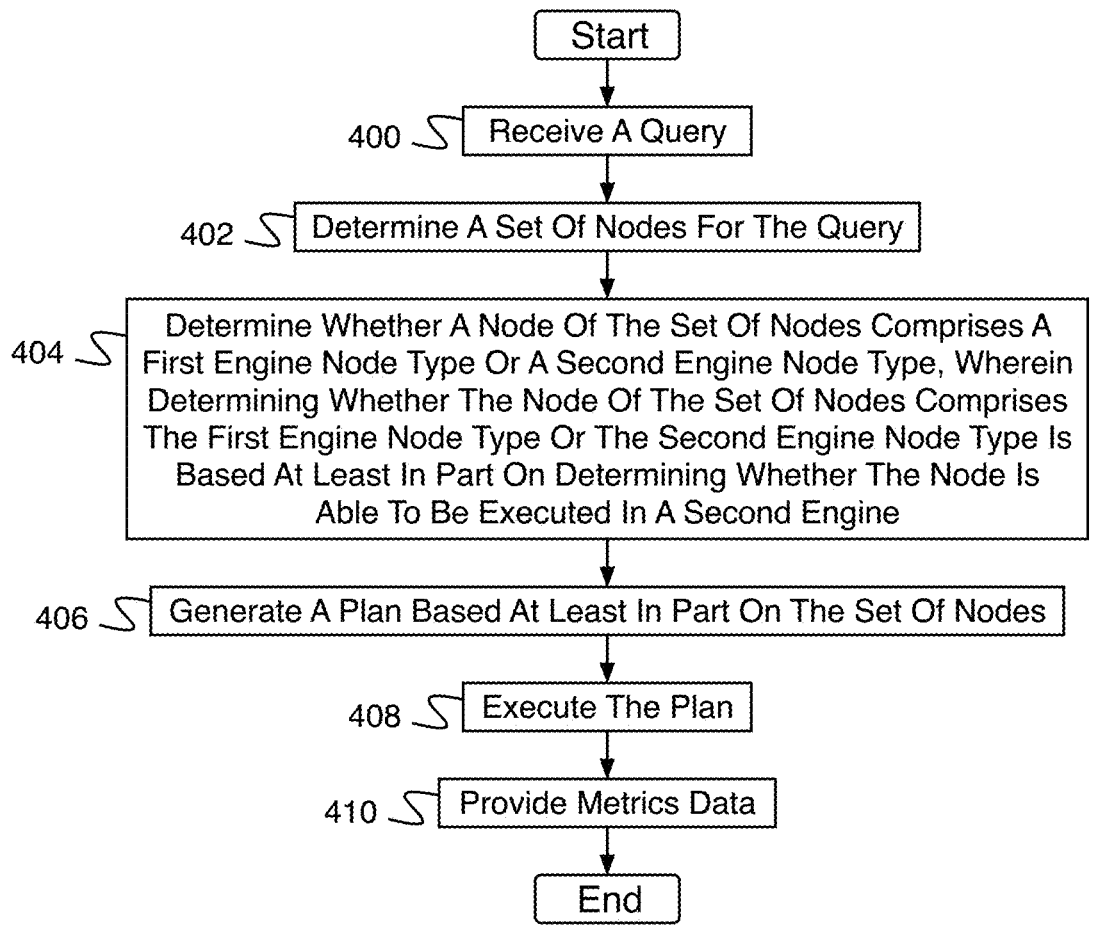
FIG. 4 is a flow diagram illustrating an embodiment of a process for an integrated native vectorized engine for computation.

FIG. 4 is a flow diagram illustrating an embodiment of a process for an integrated native vectorized engine for computation. In some embodiments, the process of FIG. 4 is executed by database system 106 of FIG. 1. In the example shown, in 400, a query is received. For example, the query comprises a database query, a SQL query, etc. In 402, a set of nodes is determined for the query. For example, the set of nodes comprises a set of steps for executing the query. In 404, it is determined whether a node of the set of nodes comprises a first engine node type or a second engine node type, wherein determining whether the node of the set of nodes comprises the first engine node type or the second engine node type is based at least in part on determining whether the node is able to be executed in a second engine. In some embodiments, the node comprises a second engine node type in the event it is able to be executed by the second engine and a first engine node type in the event it is not able to be executed by the second engine. In some embodiments, the node comprises a second engine node type in the event it is able to be executed by the second engine and it is part of a contiguous sequence of nodes that all can be executed by the second engine, and the node comprises a first engine node type otherwise. In some embodiments, the node comprises a second engine node type in the event it is able to be executed by the second engine and it is part of a contiguous sequence of nodes that all can be executed by the second engine, and wherein the sequence begins with the first node in the set of nodes, and the node comprises a first engine node type otherwise. In 406, a plan is generated based at least in part on the set of nodes. For example, generating the plan comprises generating a set of instructions for executing the set of nodes. In various embodiments, the plan comprises a plan for a first engine, a plan for a second engine, or a plan for both a first engine and a second engine. In 408, the plan is executed. In 410, metrics data is provided.

Figure 5:
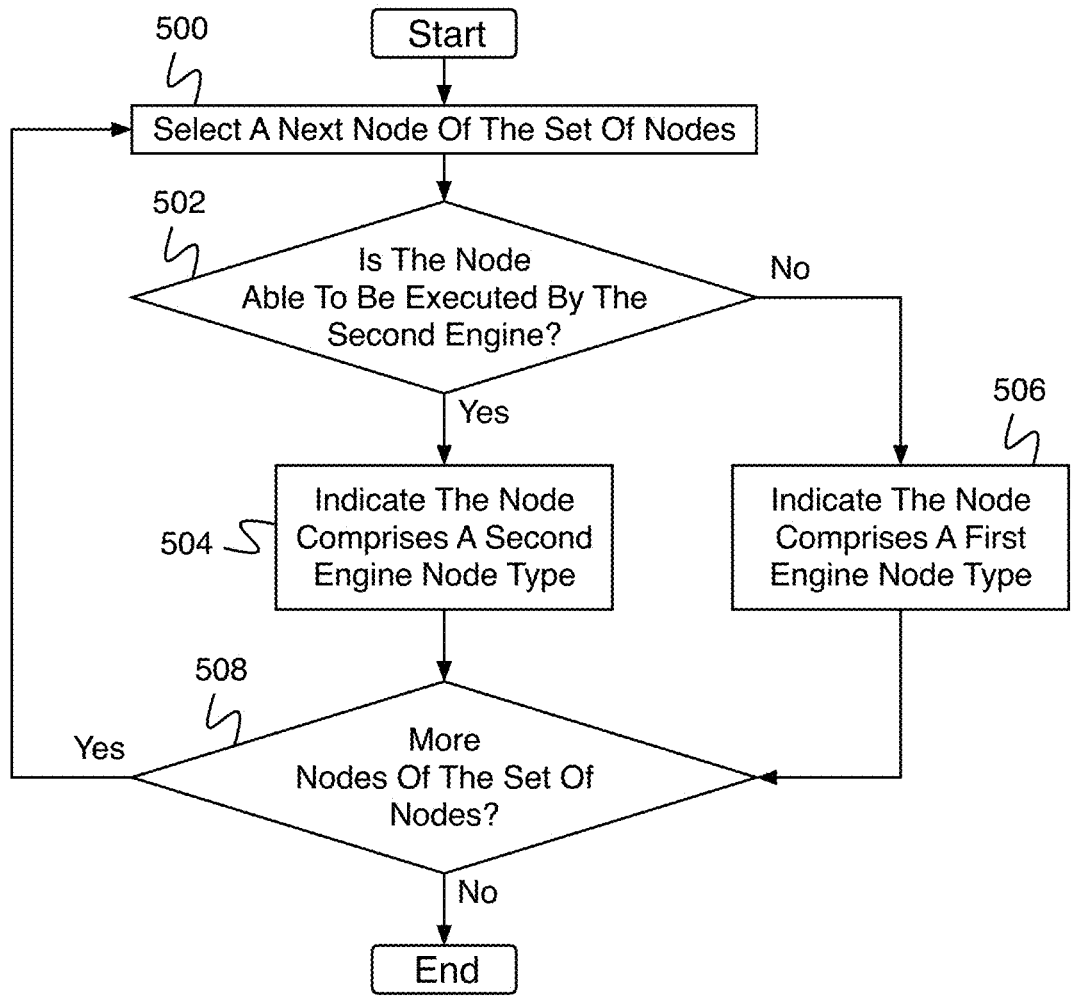
FIG. 5 is a flow diagram illustrating an embodiment of a process for determining whether a node comprises a first engine node or a second engine node.

FIG. 5 is a flow diagram illustrating an embodiment of a process for determining whether a node comprises a first engine node or a second engine node. In some embodiments, the process of FIG. 5 implements 404 of FIG. 4. For example, the process of FIG. 5 implements 404 of FIG. 4 for the case where a node comprises a second engine node type in the event that the node is able to be executed by the second engine. In the example shown, in 500, a next node of the set of nodes is selected. In 502, it is determined whether the node is able to be executed by the second engine. In some embodiments, determining whether the node is able to be executed by the second engine comprises querying the second engine, querying an execution list, or determining whether the node is able to be executed by the second engine in any appropriate way. In the event it is determined in 502 that the node is able to be executed by the second engine, control passes to 504. In 504, the process indicates the node comprises a second engine node type. Control then passes to 508. In the event it is determined in 502 that the node is not able to be executed by the second engine, control passes to 506. In 506, the process indicates the node comprises a first engine node type. In 508, it is determined whether there are more nodes of the set of nodes. In the event it is determined that there are more nodes of the set of nodes, control passes to 500. In the event it is determined that there are not more nodes of the set of nodes, the process ends.

In some embodiments, an expression is an operation that takes one or more typed values as input and produces zero or one typed values as output (e.g., "y<10" is a boolean expression). In some embodiments, the expressions comprise functions. Expressions can be nested/combined to form a tree of expressions. In some embodiments, a node is not supported by a second engine in response to the node containing an expression supported by the first engine but not the second engine. In some embodiments, a node is supported by a second engine in response to the node containing an expression supported by the first engine but not the second engine by taking the expression and executing that expression in the first engine from the second engine (e.g., in the event that the node is better processed overall in the second engine despite not supporting the execution of the expression).

Figure 6:
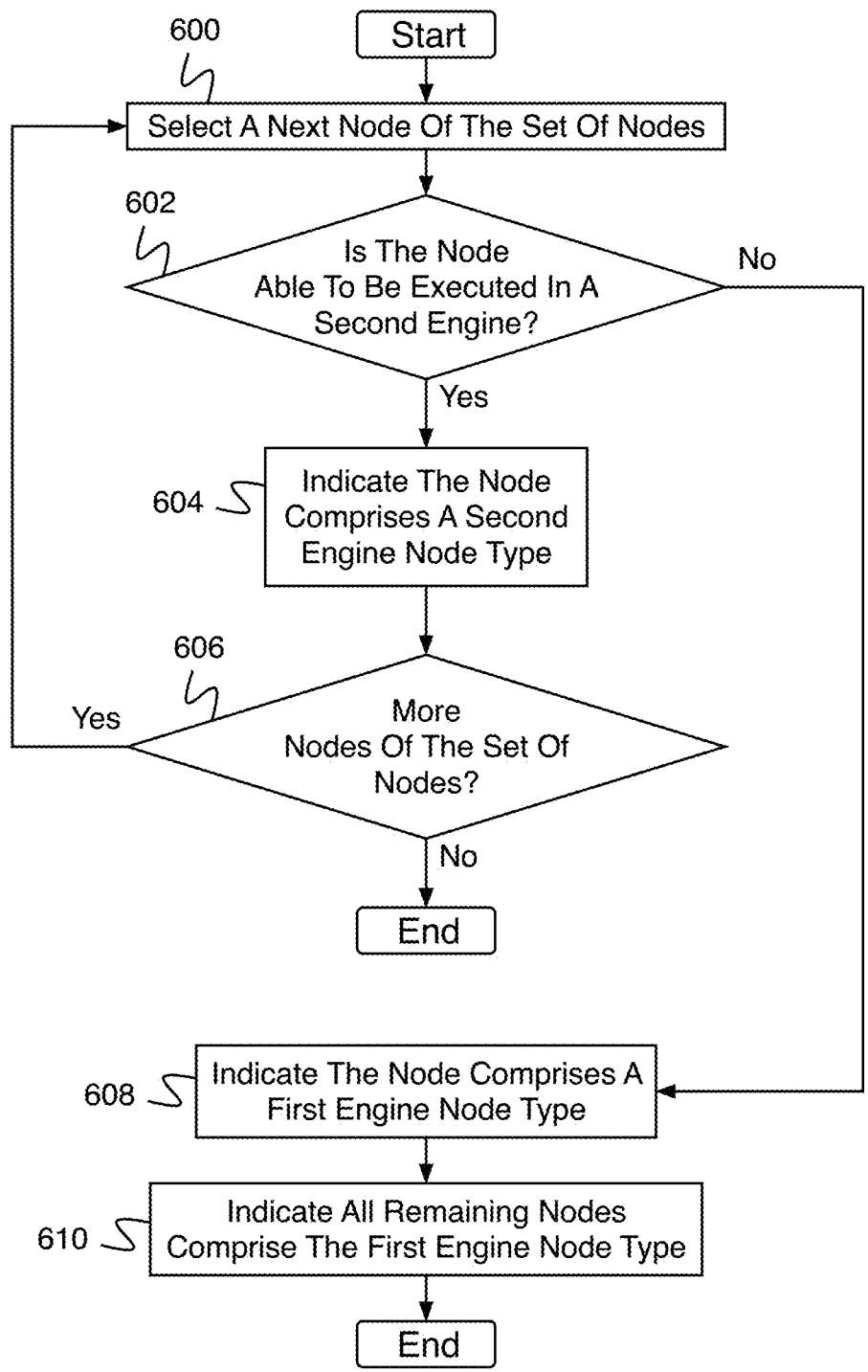
FIG. 6 is a flow diagram illustrating an embodiment of a process for determining whether a node comprises a first engine node or a second engine node.

FIG. 6 is a flow diagram illustrating an embodiment of a process for determining whether a node comprises a first engine node or a second engine node. In some embodiments, the process of FIG. 6 implements 404 of FIG. 4. For example, the process of FIG. 6 implements 404 of FIG. 4 for the case where a node comprises a second engine node type in the event that the node is able to be executed by the second engine and it is part of a contiguous group of nodes able to be executed by the second engine beginning with the first node in the set of nodes. In the example shown, in 600, a next node of the set of nodes is selected. In 602, it is determined whether the node is able to be executed in a second engine. In the event it is determined that the node is able to be executed in a second engine, control passes to 604. In 604, the process indicates the node comprises a second engine node type. In 606, it is determined whether there are more nodes of the set of nodes. In the event it is determined that there are more nodes of the set of nodes, control passes to 600. In the event it is determined that there are not more nodes of the set of nodes, the process ends.

In the event it is determined in 602 that the node is not able to be executed in a second engine, control passes to 608. In 608, the process indicates that the node comprises a first engine node type. In 610, the process indicates that all remaining nodes comprise the first engine node type, and the process ends.

Figure 7:
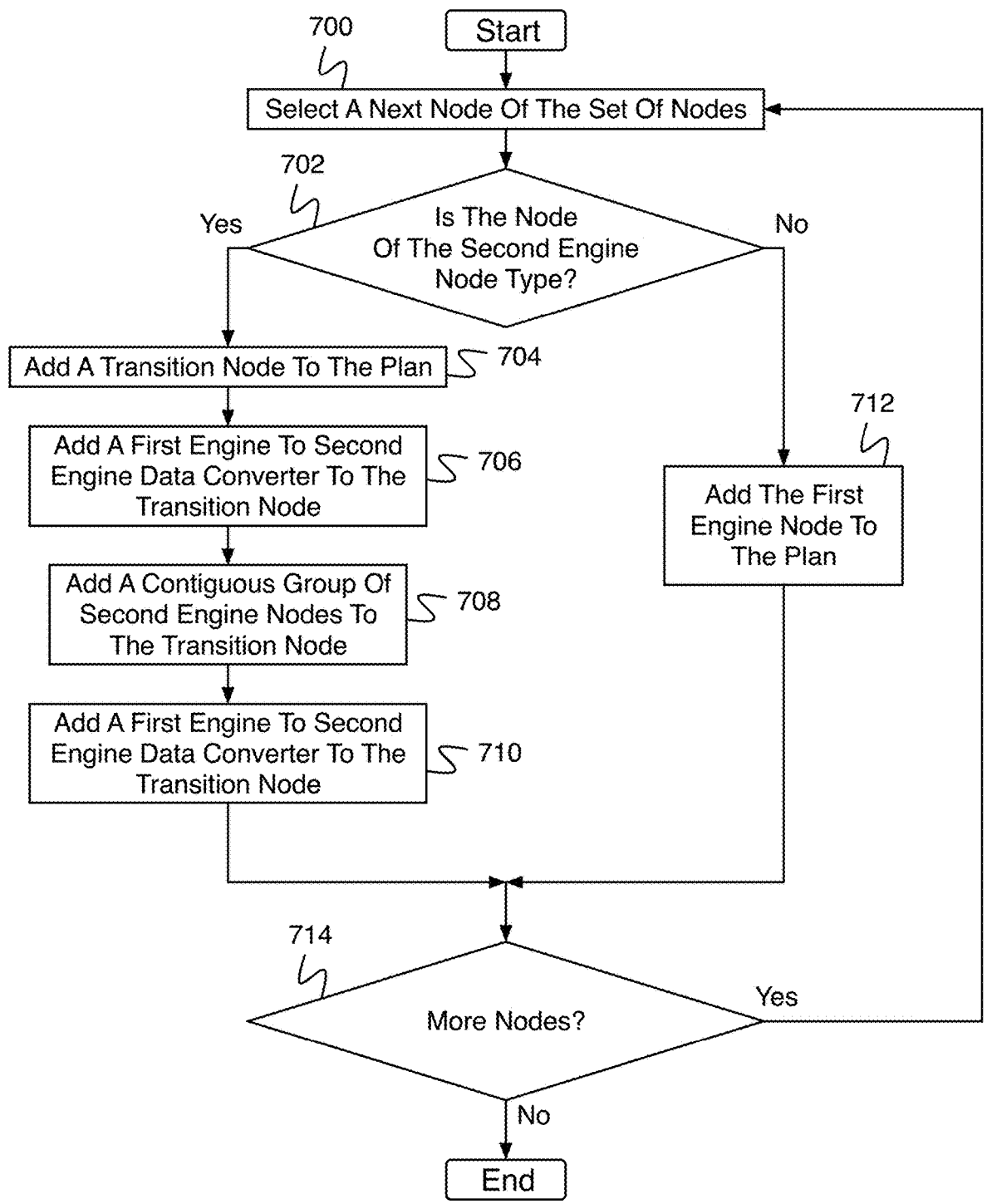
FIG. 7 is a flow diagram illustrating an embodiment of a process for generating a plan based at least in part on a set of nodes.

FIG. 7 is a flow diagram illustrating an embodiment of a process for generating a plan based at least in part on a set of nodes. For example, a plan comprises instructions for executing a set of nodes, for instance comprising an ordering of the set of nodes including indications of which engine to use to execute each node and appropriate data conversion steps. In some embodiments, the plan indicates cluster resources (e.g., a cluster machine or virtual machine) of a set of cluster resources to execute a node of the set of nodes. For example, the plan indicates transfer of data between cluster resources prior to execution of a node of the set of nodes. In some embodiments, data is translated after being transferred between cluster resources. In some embodiments, the process of FIG. 7 implements 406 of FIG. 4. In the example, shown, in 700, a next node of the set of nodes is selected. In 702, it is determined if the node is of the second engine node type. In the event the node is of the second engine node type, control passes to 704. In 704, a transition node is added to the plan. In 706, a first engine to second engine data converter is added to the transition node. In 708, a contiguous group of second engine nodes is added to the transition node. For example, the contiguous group of second engine nodes comprises the selected node and any following second engine nodes (e.g., before reaching a first engine node). In 710, a first engine to second engine data converter is added to the transition node. Control then passes to 714. In 702, in the event it is determined that the node is not of the second engine node type (e.g., the node is of the first engine node type), control passes to 712. In 712, the first engine node is added to the plan. In 714, it is determined whether there are more nodes. In the event it is determined that there are more nodes, control passes to 700. In the event it is determined that there are not more nodes, the process ends.

Figure 8A:
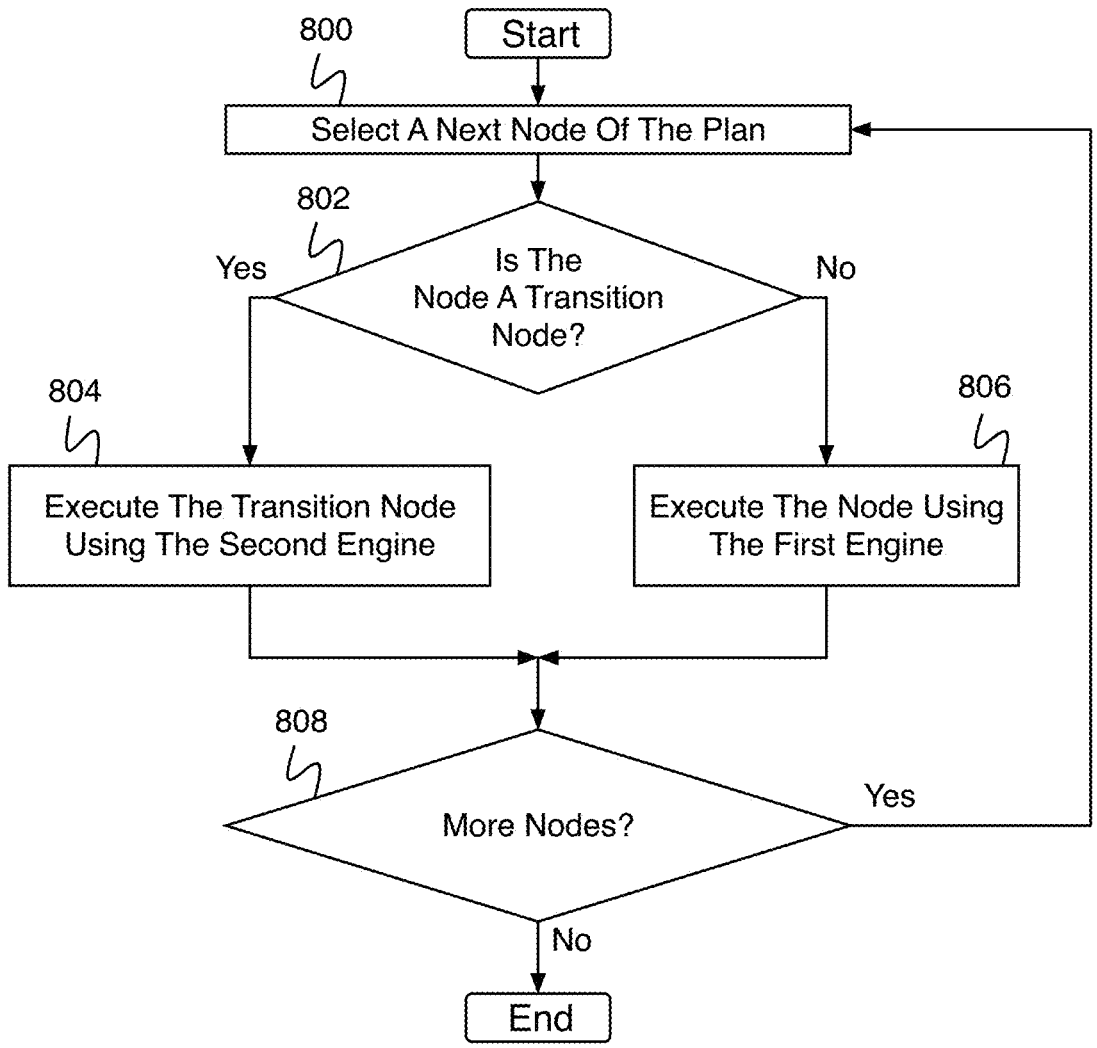
FIG. 8A is a flow diagram illustrating an embodiment of a process for executing a plan.

FIG. 8A is a flow diagram illustrating an embodiment of a process for executing a plan. In some embodiments, the process of FIG. 8 implements 408 of FIG. 4. In the example shown, in 800, a next node of the plan is selected. In 802, it is determined whether the node comprises a transition node. In the event the node comprises a transition node, control passes to 804. In 804, the transition node is executed using the second engine. Control then passes to 808. In the event it is determined in 802 that the node is not a transition node, control passes to 806. In 806, the node is executed using the first engine. In 808, it is determined whether there are more nodes. In the event it is determined that there are more nodes, control passes to 800. In the event it is determined that there are not more nodes, the process ends.

Figure 8B:
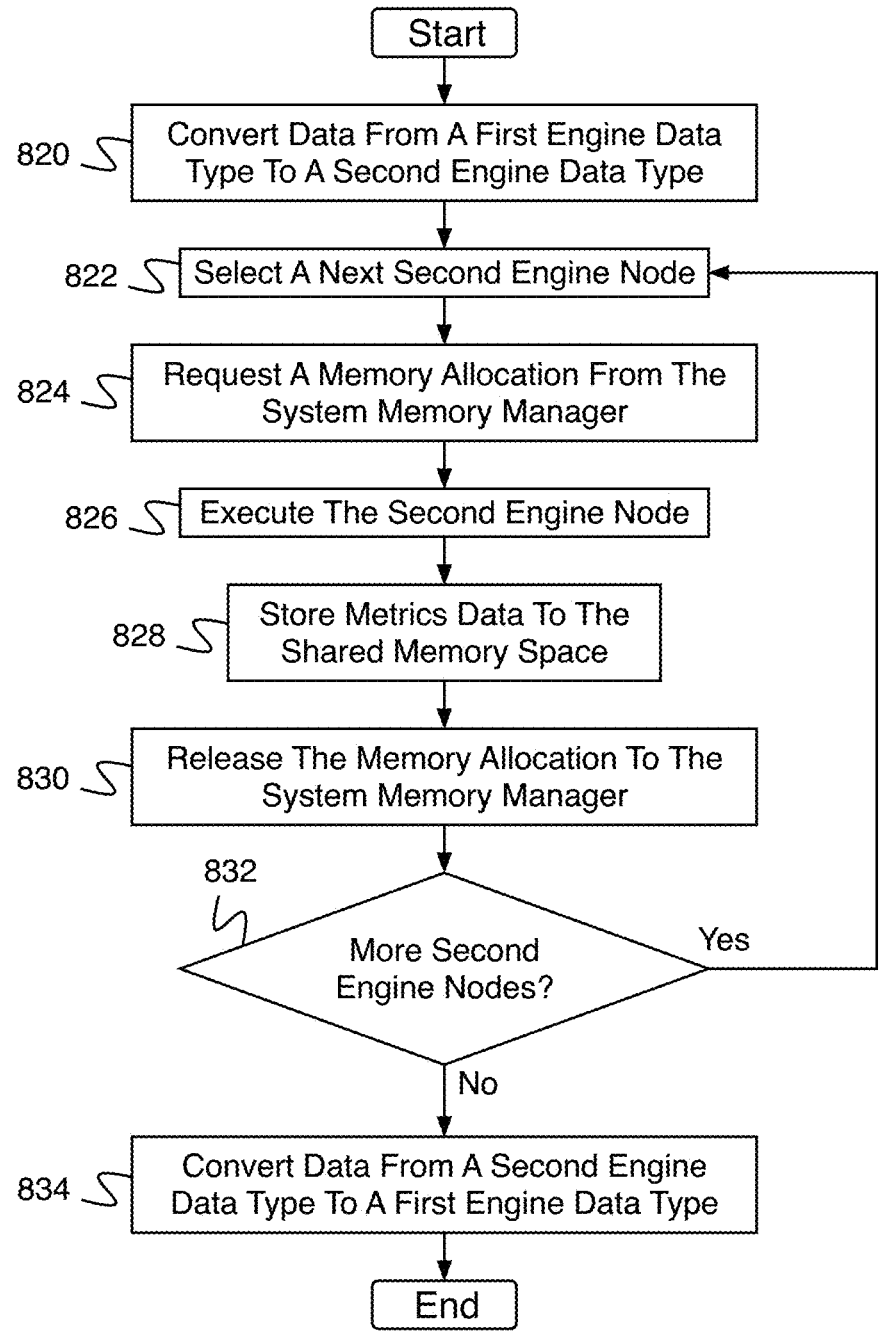
FIG. 8B is a flow diagram illustrating an embodiment of a process for executing a transition node using a second engine.

FIG. 8B is a flow diagram illustrating an embodiment of a process for executing a transition node using a second engine. In some embodiments, the process of FIG. 8B implements 804 of FIG. 8A. For example, the process of FIG. 8B is executed using a second execution engine. In the example shown, in 820, data is configured from a first engine data type to a second engine data type. In 822, a next second engine node is selected. In 824, a memory allocation is requested from the system memory manager. In 826, the second engine node is executed. The second engine node is executed using the second engine. In some embodiments, the second engine node comprises an expression indicated for execution by the first engine. For example, the second engine provides the expression indicated for execution by the first engine to the first engine for execution, and receives the expression result from the first engine. In 828, metrics data is shared to the shared memory space. In 830, the memory allocation is released to the system memory manager. In 832, it is determined whether there are more second engine nodes (e.g., more second engine nodes of the transition node yet to be executed). In the event it is determined that there are more second engine nodes, control passes to 822. For example, when a second engine node is executed after an other second engine node, data is provided from the other second engine node to the node in a second engine data format. In the event it is determined that there are not more second engine nodes, control passes to 834. In 834, data is converted from a second engine data type to a first engine data type, and the process ends.

In some embodiments, a second engine executes expressions on behalf of first engine. This is advantageous since it allows the node to run in the second engine even when the second engine does not support a given expression. For example, a second engine node internally uses a 2-to-1 translator on the given expression inputs to prepare the inputs for the first engine. The second engine then passes the inputs to the first engine (e.g., using Java native interface or something else). The first engine applies the given expression and produces outputs. The first engine then applies a 1-to-2 translator to the outputs and passes the data back to the second engine. The second engine continues processing once it hears back from first engine.

Figure 8C:
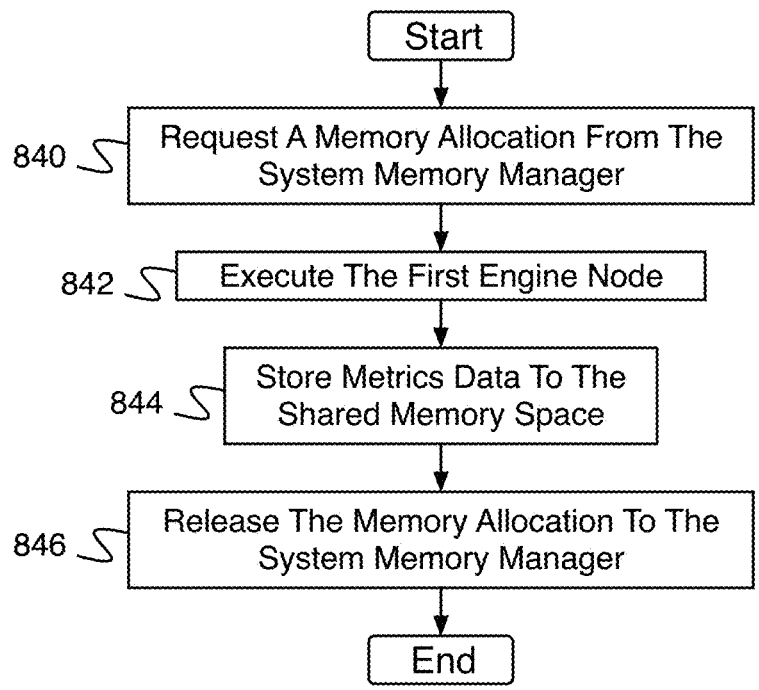
FIG. 8C is a flow diagram illustrating an embodiment of a process for executing a node using a first engine.

FIG. 8C is a flow diagram illustrating an embodiment of a process for executing a node using a first engine. In some embodiments, the process of FIG. 8C implements 806 of FIG. 8A. For example, the process of FIG. 8C is executed using a first execution engine. In the example shown, in 840, a memory allocation is requested from the system memory manager. In 842, the first engine node is executed. In 844, metrics data is stored to the shared memory space. In 846, the memory allocation is released to the system memory manager.

Figure 9:
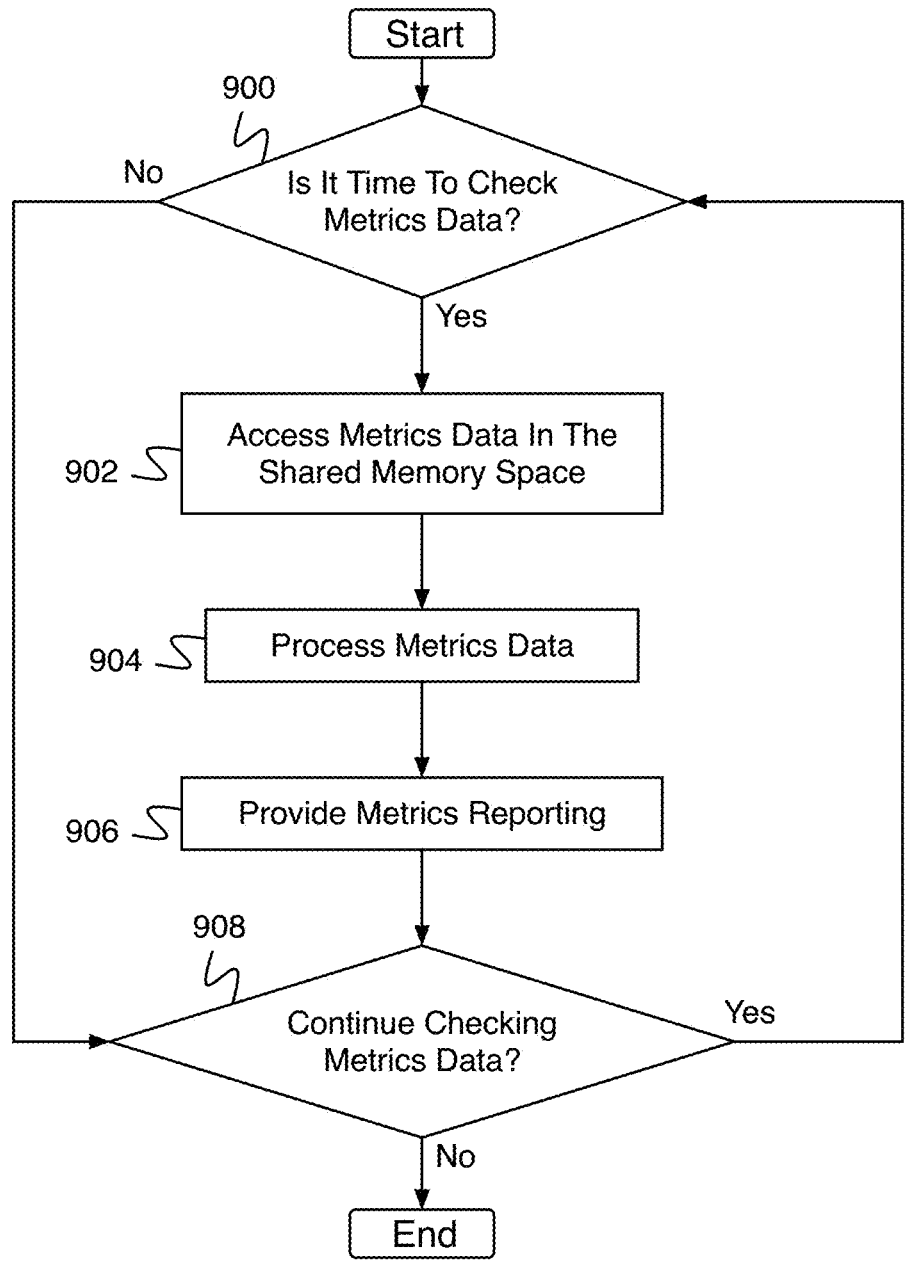
FIG. 9 is a flow diagram illustrating an embodiment of a process for providing metrics data.

FIG. 9 is a flow diagram illustrating an embodiment of a process for providing metrics data. In some embodiments, the process of FIG. 9 implements 410 of FIG. 4. In the example shown, in 900, it is determined whether it is time to check metrics data. In some embodiments, metrics data is checked periodically while executing a plan. In various embodiments, metrics data is checked once a second, once a minute, once an hour, etc. In the event it is determined that it is not time to check metrics data, control passes to 908. In the event it is determined that it is time to check metrics data, control passes to 902. In 902, metrics data in the shared memory space is accessed. In 904, metrics data is processed (e.g., aggregated, sampled, filtered, statistics are computed, data is processed using a predefined algorithm, etc.). In 906, metrics reporting is provided. In 908, it is determined whether to continue checking metrics data. In the event it is determined to continue checking metrics data, control passes to 900. In the event it is determined not to continue checking metrics data, the process ends.

Figure 10:
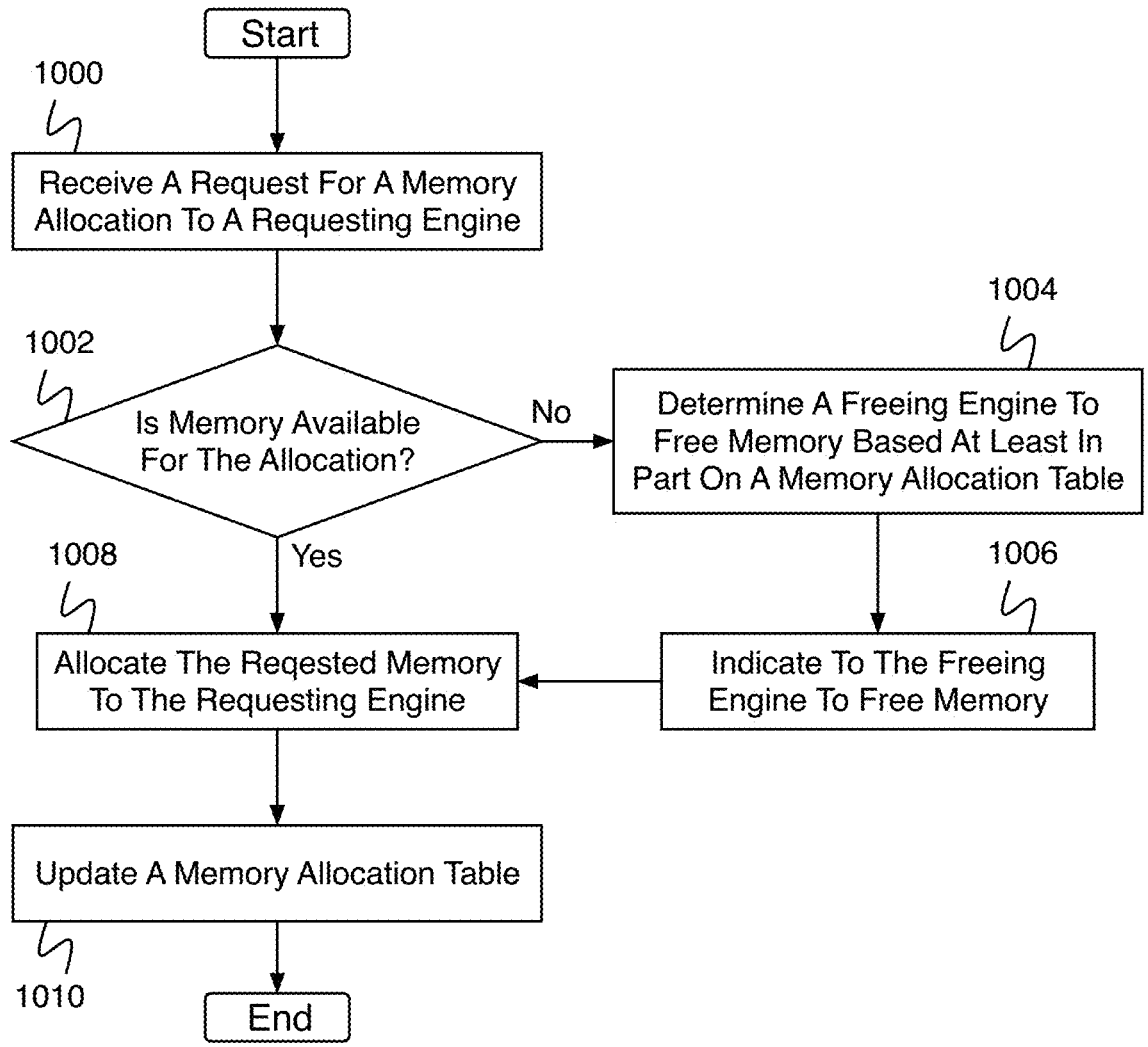
FIG. 10 is a flow diagram illustrating an embodiment of a process for responding to a request for a memory allocation.

FIG. 10 is a flow diagram illustrating an embodiment of a process for responding to a request for a memory allocation. For example, FIG. 10 comprises a process for responding to the request for a memory allocation of 824 of FIG. 8B or 840 of FIG. 8C. In some embodiments, the process of FIG. 10 is executed by a memory manager application. In the example shown, in 1000, a request for a memory allocation to a requesting engine is received. For example, the requesting engine comprises the first engine or the second engine. In 1002, it is determined whether memory is available for the allocation. In the event it is determined that memory is available for the allocation, control passes to 1008. In the event it is determined that memory is not available, control passes to 1004. In 1004, a freeing engine to free memory is determined based at least in part on a memory allocation table. For example, the freeing engine is determined based on the engine allocated a greater share of memory in the memory allocation table. For example, the freeing engine comprises the first engine or the second engine. In 1006, the process indicates to the freeing engine to free memory. In 1008, the requested memory is allocated to the requesting engine. In 1010, a memory allocation table is updated. For example, the memory allocation table is updated to reflect allocated and/or freed memory.

In some embodiments, the system makes the computer better in terms of processing speed by using a first engine type and a second engine type and using a mixture of both for processing a data set. However, there are challenges for the using the first engine type and the second engine type to process a data set including:
  Memory management because the first engine type and the second engine type may use separate memories and/or different memory organizations
  Expressions because the first engine type and the second engine type express operations differently (e.g., data exchanges and aggregations)

In some embodiments, existing mechanisms for transmitting data from a first engine are used (e.g., Spark mechanisms are used), whereas the data is processed by a second engine (e.g., a native vectorized engine).

In some embodiments, certain aggregation functions are expressed in a way that is natural to a first engine (e.g., a row by row engine—for example, a Spark engine)—but we want to execute them in a different way that is more natural to a second engine (e.g., a vectorized batched engine, a native C++ engine). In some cases, the system presents data in the format each engine wants to see.

In some embodiments, the system uses a Java to Native Interface (JNI)-zero copy interface. In some embodiments, the transfer of data from one engine to another doesn't actually do any translation on the data itself instead the transfer is separated into data and metadata (e.g., the control messages (i.e., metadata) but not the data itself are translated).

In some embodiments, for the parts of the plan that are transferred between the engines, there is a data exchange format (e.g., a Protobuf) for the control messages and pointers are sent for the data location.

In some embodiments, the two data engines (e.g., the native engine and the java virtual machine (JVM) engine) that are exchanging data understand the formats of the data so that no data translation is necessary.

In some embodiments, a process determines which elements of a processing plan are to be processed by a first engine or a second engine (or any other number of engines). For example, a plan for a first engine (e.g., a Spark JVM engine) is evaluated for a set of elements that can be processed more efficiently by a second engine. Each element of the set of elements is translated to be executed in the second engine and transmitted from the first engine to the second engine.

In some embodiments, a query is compiled into an execution plan. Example:
  SELECT COUNT(x) FROM my_table WHERE y<10 GROUP BY z
  Possible execution plan
  [SCAN my_table]-->[FILTER y<10]-->[AGG COUNT (x), GROUP z]
  Brackets [ ] denote plan node boundaries, arrows--> denote data flow In some embodiments, a first engine plan comprises a directed-acyclic-graph (DAG) of plan nodes. For example, a Spark plan is a DAG of Spark plan nodes that can be executed by a Spark engine.

In some embodiments, a plan node represents one operation (e.g., an operation like scan, filter, join, aggregate, etc.).

In some embodiments, a plan node has a list of child plan nodes. For example, a Spark plan node has a list of child Spark plan nodes.

In some embodiments, a plan node includes an expression (e.g., a math expression or other operator expression—for example, "y<10"). For example, a FilterNode will have a list of boolean expressions that all must evaluate to true for a row to pass the filter. Or an aggregation node will contain aggregate expressions like "COUNT(x)" and the grouping expressions like "z". The kind of expressions that are contained in a plan node (e.g., a Spark plan node) depends on the plan node type (e.g., aggregation vs. filter).

In some embodiments, an expression is an operation that takes one or more typed values as input and produces zero or one typed values as output (e.g., "y<10" is a boolean expression). In some embodiments, the expressions comprise functions. Expressions can be nested/combined to form a tree of expressions.

In some embodiments, a value has a value type. For example, data has a data type such as integer, string, decimal, struct, etc.

In some embodiments, an expression signature comprises an expression name, its output types, and its input types. For example, the expression signature of "y<10" comprises boolean less_than (integer, integer).

In some embodiments, a plan setup between the first engine and the second engine (e.g., between Spark engine and a native engine) is done once per query as part of query compilation. In some embodiments, plan execution happens at query runtime, and plan nodes ask child nodes to produce the next batch of data until the end-of-stream.

In some embodiments, the conversion of parts of a first engine plan to a second engine plan (e.g., a Spark plan to a native plan) comprises:
  a. Receiving a first engine plan (e.g., a Spark plan) as an input
  b. Go over the first engine plan and convert a first engine plan node to a second engine plan node if the node type and its contained expressions and data types are supported by the second engine.

c. Provide the second engine plan (e.g., a native vectorized plan) as an output

In some embodiments, determining whether the node type and its contained expressions and data types are supported by the second engine uses APIs provided by a second engine library to query the second engine capabilities from the first engine side using an interface (e.g., using APIs to query from a Spark JVM side via JNI to determine whether the native side supports the capabilities).

In some embodiments, the number of data types and plan node types are easily enumerable (e.g., the number of plan node types or data types is <100), and, for conversion, from one engine to another engine the procedure is hardcoded to convert the types from the first engine to the second engine.

In some embodiments, the number of expression signatures (expression name with return types and argument types) is huge, so for every such first engine expression (e.g., Spark expression), a second engine library function (e.g., a native engine function) is invoked via an interface (e.g., a JNI) to check if the expression signature is supported. In some embodiments, the second engine library function consults the native expression lookup table in the second engine system.

In some embodiments, a first engine plan node (e.g., Spark plan node) is converted to a second engine node (e.g., a native engine node) if the node type and all the contained expressions and data types are supported by the second engine (e.g., the native engine). In the second engine node, all expressions and data types are converted into second engine representations of the expressions and data types.

In some embodiments, the first engine plan node that is converted to a second engine plan node is kept and modified/replaced. For example, this enables something to execute in the first engine (e.g., the JVM engine) at runtime. In some embodiments, the main task execution is driven by the first engine side. For example, the first engine (e.g., the JVM side) handles task scheduling and execution using a first engine side API (e.g., a Java-side API) that can be called to drive data processing.

In some embodiments, the second engine plan nodes are executed using HasNext/GetNext methods, etc. Each GetNext returns a batch of columnar data in second engine memory that is directly consumable by the first engine side without copying (e.g., using pointers). In some embodiments, a minor setting of pointers in a Java ColumnarBatch object is needed, but no data copies.

In some embodiments, the entire first engine plan is represented as a DAG of Java objects on the JVM side. These Java objects could be original first engine plan nodes (e.g., Spark plan nodes) or second engine plan nodes (e.g., native plan nodes) or a mix thereof. They are all Java objects in the JVM.

In some embodiments, a "task" is the smallest unit of work created on behalf of a query. A task contains the plan tree to be executed (as Java objects in the JVM). A task is run by a thread in the JVM. Task execution means driving the plan tree by calling APIs on it (e.g., HasNext/GetNext) and writing the results to some output destination. In some embodiments, the results comprise a set of files that are sent to the first engine driver (e.g., a Spark driver) or to the user client.

In some embodiments, the individual converted second engine nodes serve as placeholders for runtime metrics. During plan setup native buffers are created for all the metrics, and during execution the second engine updates the values in those second engine buffers. This way all the existing first engine machinery (e.g., Spark machinery) for shipping, aggregating and reporting runtime metrics works just as before.

In some embodiments, the second engine plan nodes provide easy-to-understand EXPLAIN output so users can see which parts ran in the second engine and not. Again, all the existing first engine machinery can be used to display/walk these plan nodes.

Figure 11:
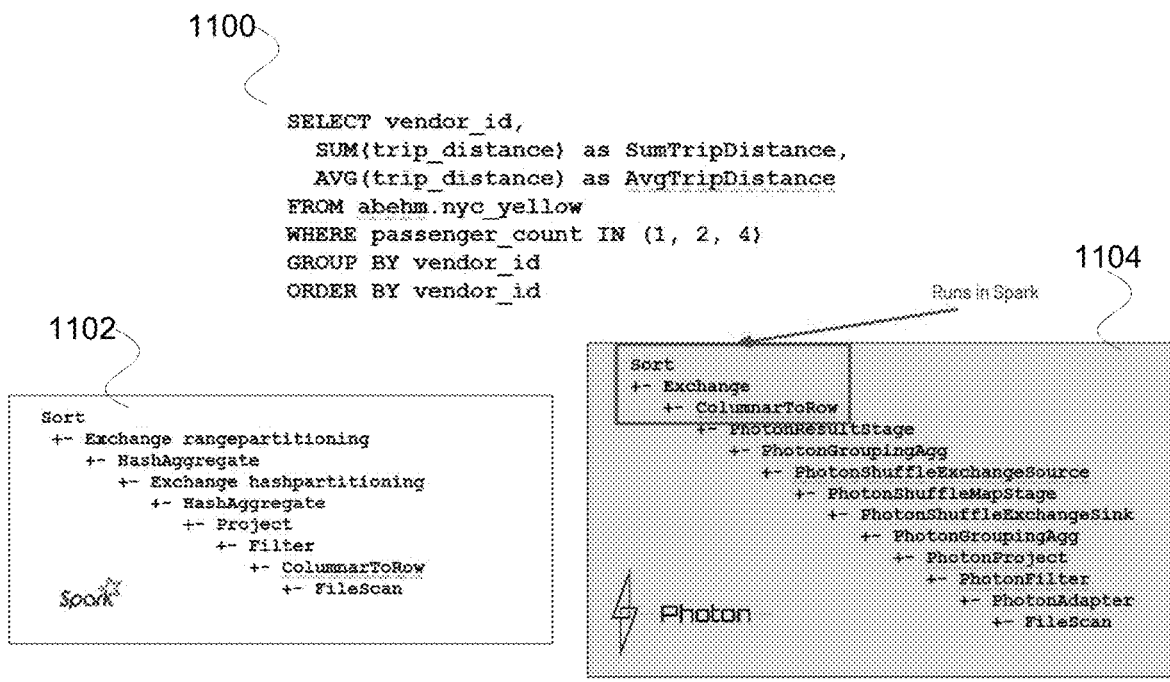
FIG. 11 is a diagram illustrating an embodiment of a process for conversion from a first engine plan to a second engine plan.

FIG. 11 is a diagram illustrating an embodiment of a process for conversion from a first engine plan to a second engine plan. In the example shown, code 1100 comprises a set of commands that are converted to a spark plan 1102. Spark plan 1102 (e.g., a first engine plan) is then converted, if appropriate, to a Photon or native engine plan 1104 (e.g., a second engine plan). Spark plan 1102 is converted from the bottom up. On the left-hand side, the conversion starts with the FileScan. In some embodiments, it is determined whether "FileScan" can be converted. In response to determining that "FileScan" can be converted, a second engine plan is started (e.g., a new native engine plan or Photon plan) by adding a second engine Adapter (e.g., a new native engine adapter or Photon adapter). In some embodiments, an operation cannot be converted but can be consumed by the second engine using an adapter. For example, in some cases the FileScan can be consumed by the new native engine or Photon with an adapter. Note: the "ColumnarToRow" node disappears because the new native engine or Photon can consume columnar data directly. The conversion continues with the Filter expression. Can it be converted? Yes, so replace it with a PhotonFilter (e.g., the second engine filter or the new native engine filter). The conversion continues with the Project expression. Can it be converted? Yes, so replace it with a PhotonProject (e.g., the new native engine project command). The conversion continues with the HashAggregate. Can it be converted? Yes, so replace it with a PhotonGroupingAgg (e.g., the new native engine grouping aggregate command). The rest of the conversion is performed in a similar fashion. The process is repeated until we hit a node that is not supported by Photon or the new native engine. In this case the expression "Exchange rangepartitioning".

In some embodiments, the node mappings are not always 1:1, but the process is always similar.

To run the remaining portion of the plan in original Spark, ColumnarToRow node is added to convert the columnar data produced by the new native engine or Photon to row-wise data needed by Spark. The rest of the Spark plan simply remains in Spark by choice. This is what is referred to as "downstream", i.e., everything that is further up the plan tree (the "data stream" flows from bottom to top).

Note that perhaps the new native engine or Photon can run the "Sort" (or other later nodes) but this is chosen to still run it in Spark.

In some embodiments, the sort is run in the new native engine or Photon by adding a RowToColumnar node to convert from row-wise data to columnar data so the new native engine or Photon can consume the data and run the Sort.

In some embodiments, this is not selected as to avoid many of these sometimes expensive RowToColumnar and ColumnarToRow conversions.

In some embodiments, the task scheduling and execution is driven by the first engine side even if the entire plan is converted to the second engine side. For example, the JVM side performs the task scheduling and execution, even if the entire plan is photonized (i.e., converted to use the second engine).

In some embodiments, the JVM side will first create/prepare the plan for execution. For a plan with the new native engine or Photon nodes, the JVM side first needs to create a native engine plan or Photon plan to be executed on the native side by calling a native "createPlan" function on the native engine library or Photon library. This call returns a handle to the native engine plan or Photon plan that is executed as usual by calling HasNext/GetNext methods provided by the plan root.

In some embodiments, the native engine portion of the plan is serialized into a representation suitable for in-process transmission via memory. In various embodiments, Protocol Buffers (e.g., Google Protocol Buffers) are used for this purpose. In some embodiments, another serialization mechanism is used (e.g. JSON, flatbuffers, etc.).

In some embodiments, on the native side, the new native engine library or Photon library receives this serialized plan, deserializes it and then constructs the internal data structures (e.g., plan tree, expression trees, etc.) suitable for execution. This native plan is driven by the JVM side via a native interface that implements an Open/HasNext/GetNext/Close interface.

Memory Management

In some embodiments, the two engines could run in the same process and share the same address space and process limits. In particular, the operating system (OS) may impose a limit on the memory used by the entire process—when the process goes above it gets killed by the OS.

In some embodiments, the two engines could have completely separate memory allocation and accounting mechanisms (e.g. the JVM heap and native memory, on-heap vs. off-heap), leading to a problem where both engines allocate memory independently possibly going above the OS limit or other engine-specific limits like the Java heap-size limit (–Xmx). These allocation mechanisms need to be coordinated between the two engines, and between JVM on-heap and native memory.

In particular, these memory consumers need to be coordinated:
1. The JVM-side engine uses on-heap memory managed by the JVM.
2. The JVM-side engine uses native memory not managed by the JVM but manually managed by the first engine
3. The native engine must use native memory not managed by the JVM The on-heap memory and the native memory both count towards the process memory usage, so their sum cannot exceed the process memory limit. As a result, these 3 memory consumers must be coordinated, as follows.

Configuration/Process Setup

First, the process is started by constraining the JVM on-heap memory via configuration as part of the process setup/configuration (e.g., using a configuration file or parameter that is assigned prior to or in conjunction with running the process). It is decided up-front how much memory to give to the JVM, typically around 10-20% of the total memory available to the process. This on-heap memory is not available for consumption by the native engine or by those parts of the JVM-engine that require native memory. This leaves us 80-90% of memory for native allocations. The JVM-engine is configured to mostly use native memory. It's noteworthy that the memory management challenge is much harder if the existing JVM engine does not support working with native memory because otherwise the memory would have to be split 50/50 among native and JVM on-heap memory since the native engine cannot practically work with on-heap JVM memory.

Runtime Allocation and Accounting

Next, a memory manager accessible by both engines serves the purpose of coordinating native allocations during runtime. The memory manager is responsible for giving out "reservations" that grant an engine the right to allocate memory of a certain amount. The memory manager resides in the JVM and is accessed by the native engine via JNI. Even further, it is desirable to impose certain memory usage limits on individual tasks/threads in the system, so the memory manager needs to be generalized to accommodate further subdividing of its available memory budget.

This question of resource sharing and coordination is not just limited to memory—although memory is the most challenging. Similar questions exist for other system resources like threads, CPU cycles, disk space, files, etc. Similar mechanisms (e.g., configuration or setup parameters or configuration and during process setting of resource reservations/allocations) are used to solve all coordination challenges. Typically, there is a "manager" or "pool" on the JVM for managing a particular resource, and the native engine calls the appropriate APIs of the manager via JNI to coordinate its activities with the JVM-side engine.

Figure 12:
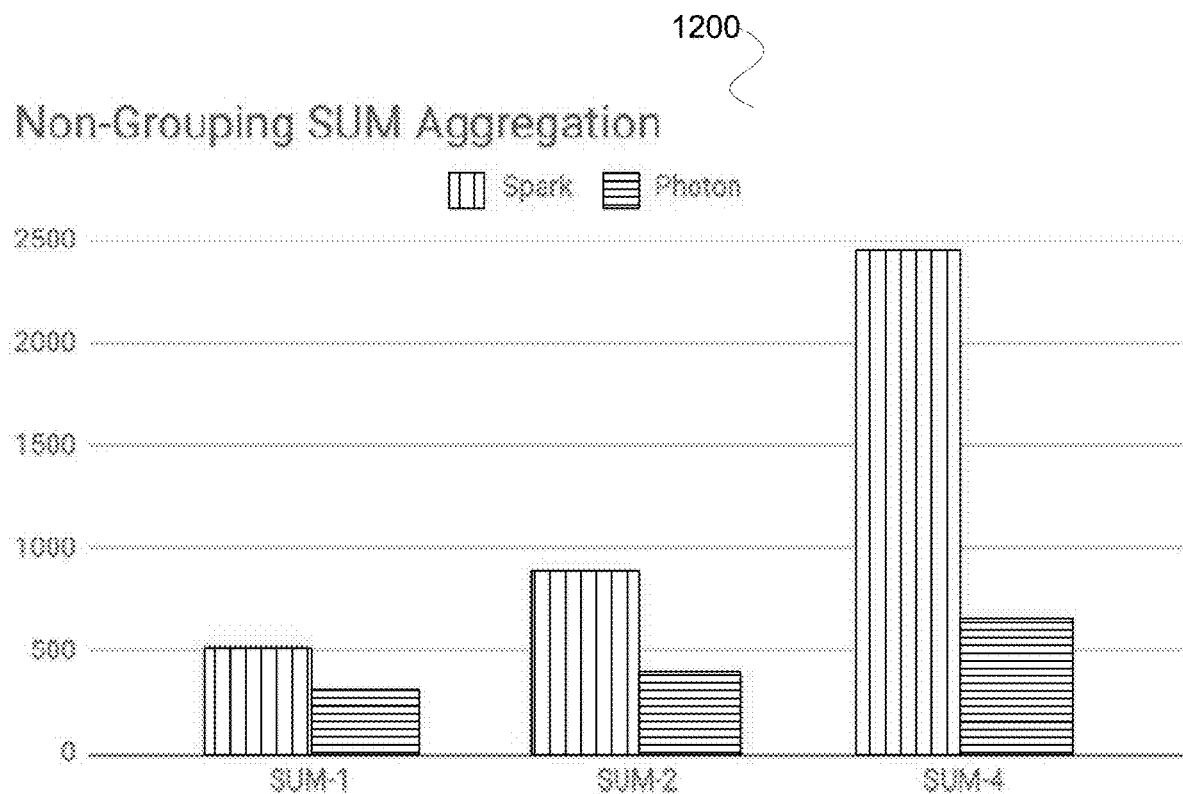
FIG. 12 is a diagram illustrating an embodiment of a test.

FIG. 12 is a diagram illustrating an embodiment of a test. In the example shown, in graph 1200 a comparison of time to completion of non-grouping SUM aggregations using a spark engine and a photon engine. Three sums are called SUM-1, SUM-2, and SUM-4. SUM-1 comprises SELECT SUM(c1) FROM cached table. SUM-2 comprises SELECT SUM(c1), SUM(c2) FROM cached table. SUM-4 comprises SELECT SUM(c1), SUM(c2), SUM(c3), SUM(c4) FROM cached table. In the comparisons, in each case the photon engine performs the calculation faster. Note that the units on the y-axis are milliseconds.

Figure 13:
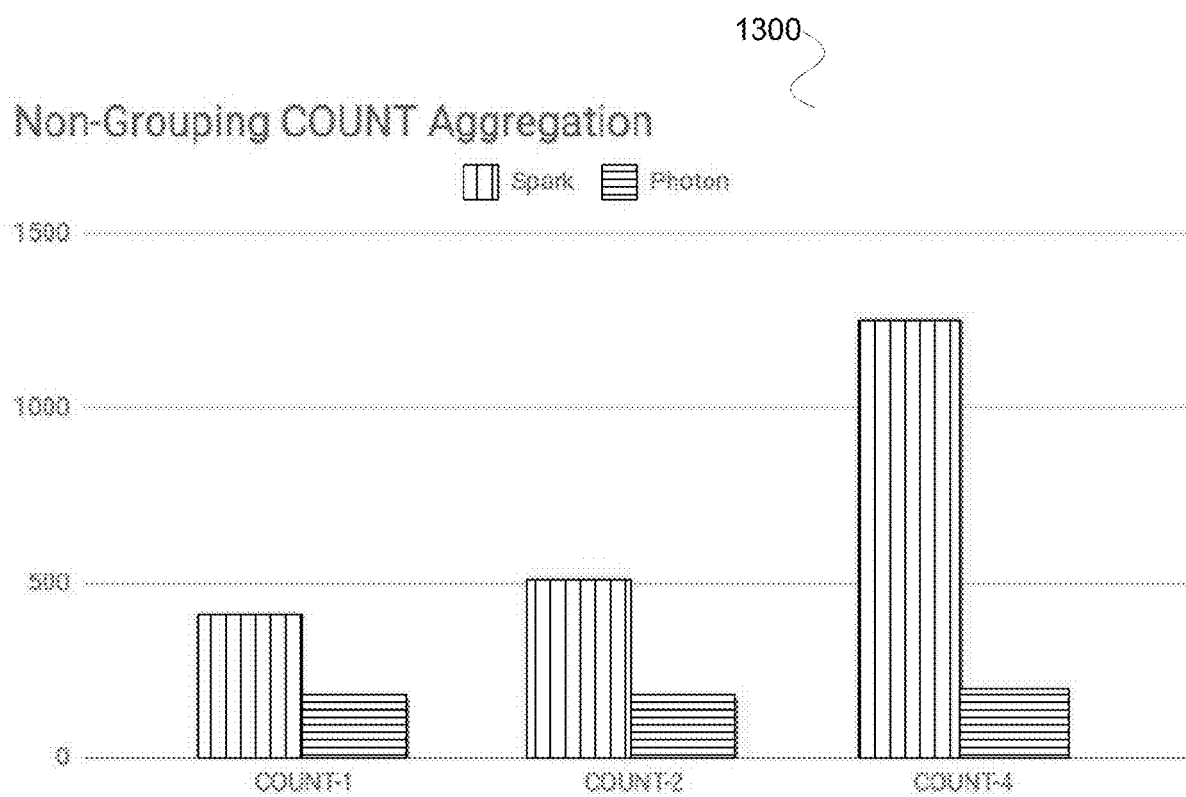
FIG. 13 is a diagram illustrating an embodiment of a test.

FIG. 13 is a diagram illustrating an embodiment of a test. In the example shown, in graph 1300 a comparison of time to completion of non-grouping COUNT aggregations using a spark engine and a photon engine. Three sums are called COUNT-1, COUNT-2, and COUNT-4. COUNT-1 comprises SELECT COUNT (c1) FROM cached table. COUNT-2 comprises SELECT COUNT (c1), COUNT (c2) FROM cached table. COUNT-4 comprises SELECT COUNT (c1), COUNT (c2), COUNT (c3), COUNT (c4) FROM cached table. In the comparisons, in each case the photon engine performs the calculation faster. Note that the units on the y-axis are milliseconds.

Figure 14:
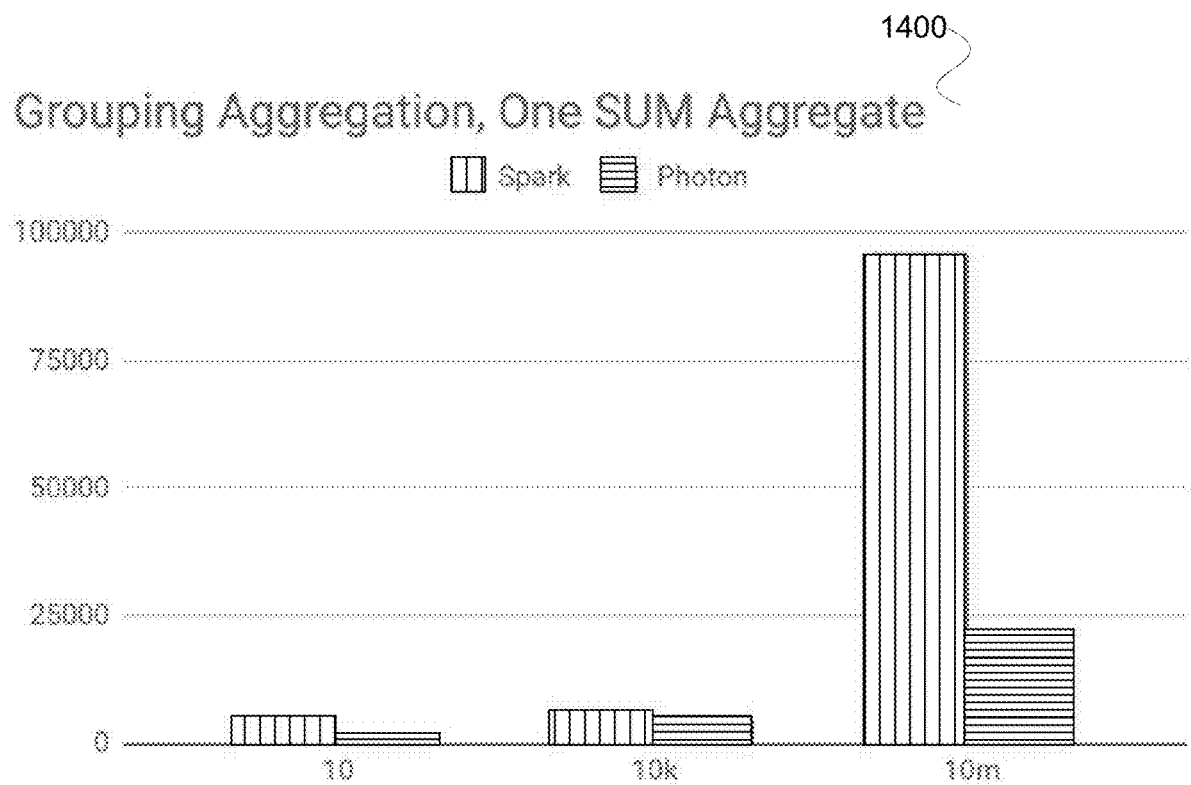
FIG. 14 is a diagram illustrating an embodiment of a test.

FIG. 14 is a diagram illustrating an embodiment of a test. In the example shown, in graph 1400 a comparison of time to completion of grouping aggregation, a one SUM aggregate, using a spark engine and a photon engine. Three sums are calculated: 10 groups, 10K groups, and 10M groups. The aggregate comprises SELECT gby_col, SUM(col) FROM cached table Group BY gby_col. In the comparisons, in each case the photon engine performs the calculation faster, but the gains are most notable in the 10M group comparison. Note that the units on the y-axis are milliseconds.

Figure 15:
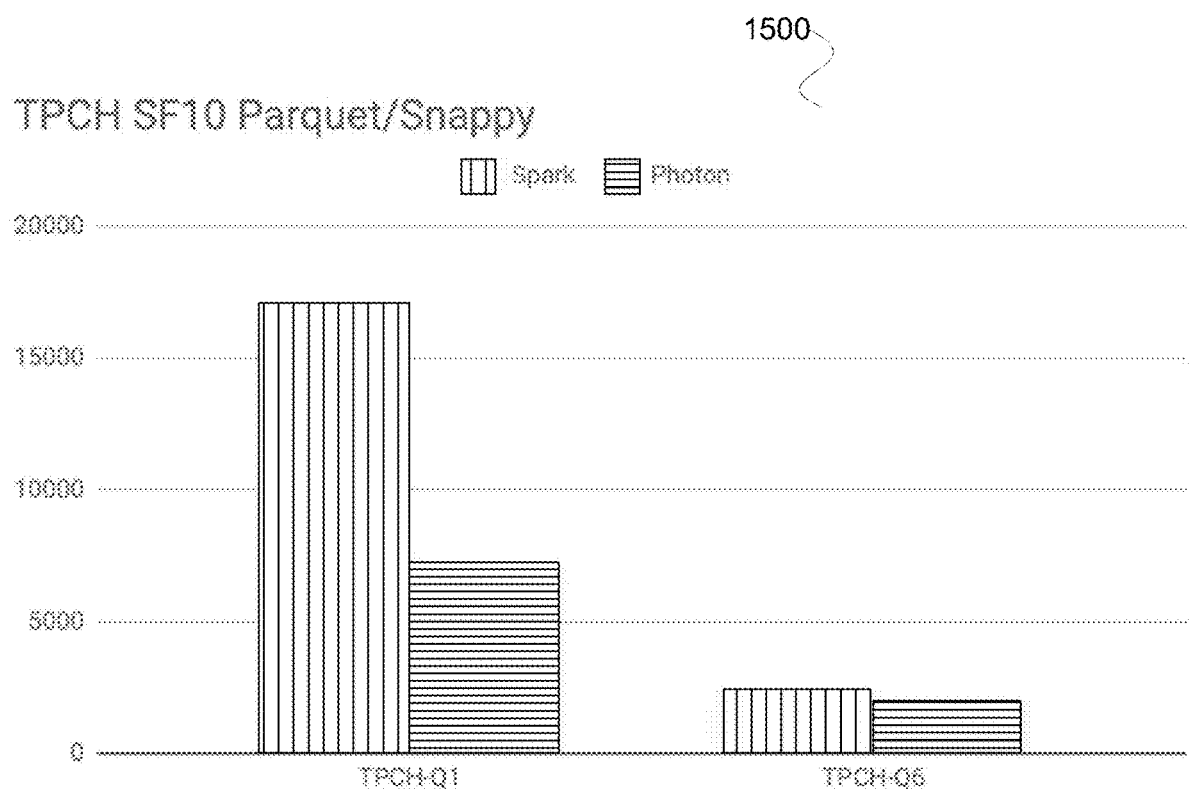
FIG. 15 is a diagram illustrating an embodiment of a test.

FIG. 15 is a diagram illustrating an embodiment of a test. In the example shown, in graph 1500 a comparison of time to completion of benchmarks using a spark engine and a photon engine. Two benchmarks are calculated: Transaction processing Performance Council (TPC) Benchmark H Q1 and Q6. In the comparisons, in each case the photon engine performs the calculation faster, but the gains are most notable in the Q1 benchmark comparison. Note that the units on the y-axis are milliseconds.

Figure 16:
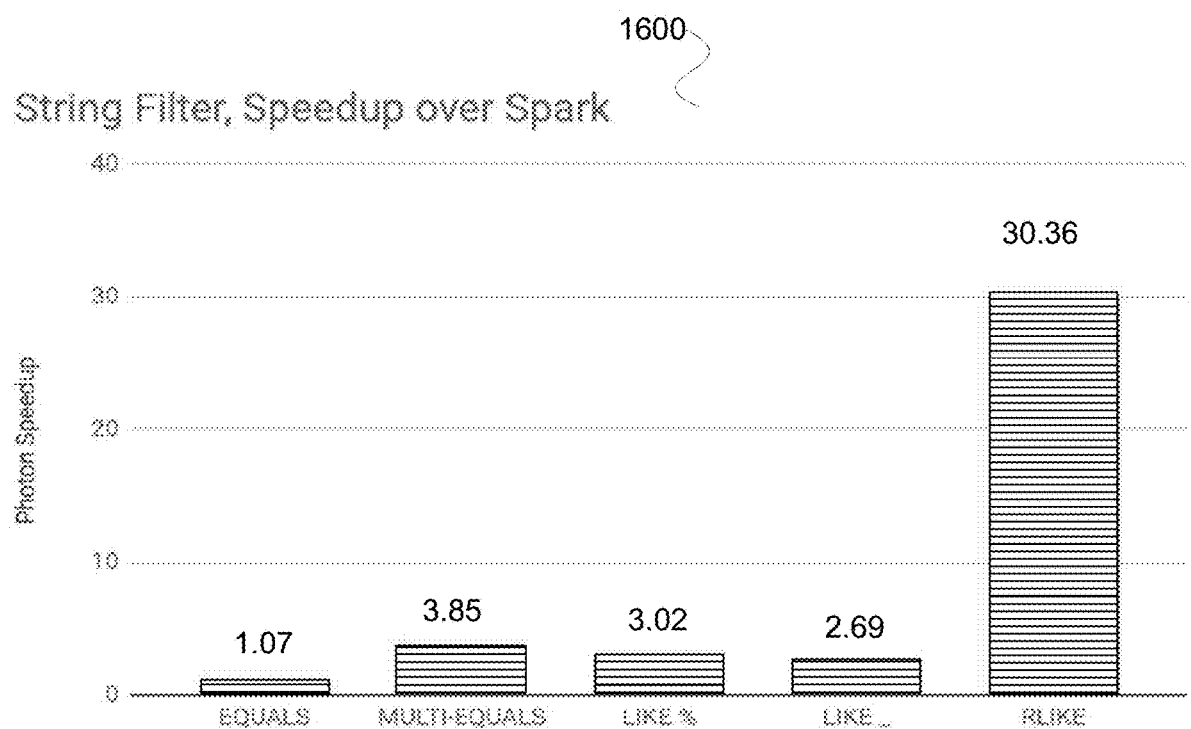
FIG. 16 is a diagram illustrating an embodiment of a test.

FIG. 16 is a diagram illustrating an embodiment of a test. In the example shown, in graph 1600 a speed up factor for a string filter is shown for a photon engine compared to a Spark engine. Five string filters are calculated in SELECT COUNT(*) FROM tpch_sf10_parquet.lineitem WHERE <condition>: EQUALS (e.g., I_comment='use fluffily accounts. ca'); MULTI-EQUALS (e.g., I_returnflag='R' and I_linestatus='F' and I_shipinstruct='COLLECT COD' and I_shipmode='REG AIR'); LIKE % (e.g., I_comment LIKE 'a%Ion%the%fur'); LIKE_(e.g., I_comment LIKE 'car_fully_express_ackages'); and RLIKE (e.g., I_comment RLIKE'.*ss.*pint). In the comparisons, in each case the photon engine performs the calculation faster (e.g., 1.07×, 3.85×, 3.02×, 2.69×, and 30.36×, respectively) but the gains are most notable in the RLIKE comparison. Note that the units on the y-axis are the factor multiplier.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  an interface configured to:
    receive a query;
  a processor configured to:
    determine a set of nodes for the query;
    determine whether a node of the set of nodes comprises a first engine node type or a second engine node type, wherein determining whether the node of the set of nodes comprises the first engine node type or the second engine node type is based at least in part on determining whether the node is able to be executed in a second; engine, wherein the node of the set of nodes comprises the first engine node type in response to determining that the node is not able to be executed in the second engine;
    generate a plan based at least in part on the set of nodes, comprising to:
      determine whether a node of the set of nodes is a second engine node type; and
      in response to a determination that the node of the set of nodes is the second engine node type:
        add a transition node to the plan; and
        add a first engine to second engine data converter and a contiguous group of second engine nodes to the transition node; and
    execute the plan, comprising to:
      determine whether a node of the plan is the transition node; and
      in response to a determination that the node of the plan is the transition node:
        convert data from a first engine data format to a second engine data format; and
        execute the second engine node type; and
  a memory coupled to the processor and configured to provide the processor with instructions.

2. The system of claim 1, wherein the node of the set of nodes comprises the second engine node type in response to determining that the node is able to be executed in the second engine.

3. The system of claim 1, wherein the node of the set of nodes comprises the second engine node type in response to determining that the node is able to be executed in the second engine and the node is in a contiguous sequence of nodes that all can executed in the second engine.

4. The system of claim 1, wherein the node of the set of nodes comprises the first engine node type in response to not being in a contiguous sequence of nodes that all can be executed in the second engine.

5. The system of claim 1, wherein generating the plan comprises generating instructions for executing the set of nodes.

6. The system of claim 5, wherein executing the node of the set of nodes of the second engine node type comprises storing metrics data to a shared memory space.

7. The system of claim 6, wherein metrics data is stored to the shared memory space by the first engine or by the second engine.

8. The system of claim 6, wherein metrics data is retrieved from the shared memory space by the first engine.

9. The system of claim 5, wherein executing the node of the set of nodes of the first engine node type after executing an other node of the second engine node type comprises translating data in memory from a second engine data format to a first engine data format.

10. The system of claim 5, wherein executing the node of the set of nodes of the second engine node type after executing an other node of the second engine node type comprises transferring data from the other node to the node in a second engine data format.

11. The system of claim 5, wherein executing the node of the set of nodes of the second engine node type comprises executing an expression using a first engine.

12. The system of claim 1, wherein the node is executed using a first engine in response to the node having the first engine node type and is executed using the second engine in response to the node having the second engine node type.

13. The system of claim 1, wherein a first engine or the second engine requests a memory allocation from a system memory manager or releases the memory allocation to the system memory manager.

14. The system of claim 1, wherein the plan indicates cluster resources to execute a node of the set of nodes.

15. The system of claim 1, wherein the plan indicates transfer of data between cluster resources prior to execution of a node of the set of nodes.

16. The system of claim 15, wherein the data is translated after being transferred between cluster resources.

17. The system of claim 1, wherein determining the node of the set of nodes further comprises determining whether the node comprises a third engine node type based at least in part on determining whether the node is able to be executed in a third engine.

18. A method comprising:
  receiving a query;
  determining, using a processor, a set of nodes for the query;
  determining whether a node of the set of nodes comprises a first engine node type or a second engine node type, wherein determining whether the node of the set of nodes comprises the first engine node type or the second engine node type is based at least in part on determining whether the node is able to be executed in a second engine, wherein the node of the set of nodes comprises the first engine node type in response to determining that the node is not able to be executed in the second engine;
  generating a plan based at least in part on the set of nodes, comprising:
    determining whether a node of the set of nodes is a second engine node type; and in response to a determination that the node of the set of nodes is the second engine node type:
adding a transition node to the plan; and
adding a first engine to second engine data converter and a contiguous group of second engine nodes to the transition node; and
executing the plan, comprising:
determining whether a node of the plan is the transition node; and
in response to a determination that the node of the plan is the transition node:
converting data from a first engine data format to a second engine data format; and
executing the second engine node type.

19. A computer program product embodied in a non-transitory computer readable medium and comprising computer instructions for:
receiving a query;
determining, using a processor, a set of nodes for the query;
determining whether a node of the set of nodes comprises a first engine node type or a second engine node type, wherein determining whether the node of the set of nodes comprises the first engine node type or the second engine node type is based at least in part on determining whether the node is able to be executed in a second engine, wherein the node of the set of nodes comprises the first engine node type in response to determining that the node is not able to be executed in the second engine;
generating a plan based at least in part on the set of nodes, comprising:
determining whether a node of the set of nodes is a second engine node type; and
in response to a determination that the node of the set of nodes is the second engine node type:
adding a transition node to the plan; and
adding a first engine to second ermine data converter and a contiguous group of second engine nodes to the transition node; and
executing the plan, comprising:
determining whether a node of the plan is the transition node; and
in response to a determination that the node of the plan is the transition node:
converting data from a first engine data format to a second engine data format; and
executing the second engine node type.

* * * * *

UNITED STATES PATENT AND TRADEMARK OFFICE
CERTIFICATE OF CORRECTION

PATENT NO. : 11,586,624 B2
APPLICATION NO. : 17/237979
DATED : February 21, 2023
INVENTOR(S) : Xin et al.

It is certified that error appears in the above-identified patent and that said Letters Patent is hereby corrected as shown below:

On the Title Page

Item (71), in Column 1, in "Applicant", Line 1, delete "Databricks" and insert -- Databricks, --, therefor.

In the Claims

In Column 17, in Claim 1, Line 35, delete "second;" and insert -- second --, therefor.

In Column 17, in Claim 3, Line 67, delete "can executed" and insert -- can be executed --, therefor.

In Column 20, in Claim 19, Line 14, delete "ermine" and insert -- engine --, therefor.

Signed and Sealed this
Twenty-seventh Day of February, 2024

Katherine Kelly Vidal
*Director of the United States Patent and Trademark Office*